United States Patent [19]

Shimauchi et al.

[11] Patent Number: 5,761,318
[45] Date of Patent: Jun. 2, 1998

[54] METHOD AND APPARATUS FOR MULTI-CHANNEL ACOUSTIC ECHO CANCELLATION

[75] Inventors: Suehiro Shimauchi, Tokyo; Shoji Makino, Machida; Junji Kojima, Tokyo, all of Japan

[73] Assignee: Nippon Telegraph and Telephone Corporation, Tokyo, Japan

[21] Appl. No.: 720,207

[22] Filed: Sep. 25, 1996

[30] Foreign Application Priority Data

Sep. 26, 1995 [JP] Japan .................................. 7-247724
Mar. 21, 1996 [JP] Japan .................................. 8-064708

[51] Int. Cl.⁶ .................................................. H04B 3/20
[52] U.S. Cl. .................. 381/66; 381/66; 381/94.1; 381/71; 379/410
[58] Field of Search .......................... 381/66, 71, 94.1; 379/410, 411, 412, 389, 399

[56] References Cited

U.S. PATENT DOCUMENTS

| | | | |
|---|---|---|---|
| 5,272,695 | 12/1993 | Makino et al. | 379/410 |
| 5,323,459 | 6/1994 | Hirano | 379/391 |
| 5,371,789 | 12/1994 | Hirano | 379/410 |
| 5,396,554 | 3/1995 | Hirano et al. | 379/410 |
| 5,408,530 | 4/1995 | Makino et al. | 379/392 |
| 5,513,265 | 4/1996 | Hirano | 379/410 |
| 5,539,731 | 7/1996 | Haneda et al. | 379/410 |
| 5,602,765 | 2/1997 | Tanaka et al. | 364/724.19 |
| 5,661,813 | 8/1997 | Shimauchi et al. | 381/66 |

*Primary Examiner*—Sinh Tran
*Attorney, Agent, or Firm*—Pollock, Vande Sande & Priddy

[57] ABSTRACT

In a multi-channel acoustic echo cancellation, received signals in a plurality of channels are radiated as acoustic signals by a plurality of loudspeakers, received signal vectors in these channels are combined into a combined vector and a rearranged received signal vector in the case of at least two channels being exchanged is generated. By inputting the combined received signal vector into an echo replica generating part which simulates echo paths from the loudspeakers to at least one microphone, an echo replica is generated. The echo replica is subtracted from an echo output from the microphone to obtain a residual echo. Based on the relationship between the received signal vector and the corresponding residual echo and between the rearranged received signal vector and the corresponding approximated residual echo, an adjustment vector is obtained which is used to adjust the estimated echo path vector representing an impulse response of the echo replica generating part.

25 Claims, 14 Drawing Sheets

METHOD AND APPARATUS FOR MULTI-CHANNEL ACOUSTIC ECHO CANCELLATION

BACKGROUND OF THE INVENTION

The present invention relates to a method and apparatus for multi-channel acoustic echo cancellation which cancel room echoes which would otherwise cause howling and present psycho-acoustic problems in a teleconference system with a multi-receive-channel system.

There have been proposed echo cancellers with a view to offering a hands-free telecommunication system which is excellent in double-talk performance and is almost free from the influence of echoes.

A description will be given first, with reference to FIG. 1, of a conventional method and apparatus for one-channel acoustic echo cancellation. In the hands-free telecommunication, there are two cases where the received signal provided at a received signal input terminal 11 is reproduced intact by a loudspeaker 12 and where the received signal is reproduced by the loudspeaker 12 after being subjected to some processing by a received signal processing part 13 which automatically controls its gain in accordance with the amplitude, power or the like of the received signal. On this account, the received signal $x_1(k)$ mentioned herein is not limited specifically to the received signal itself from the person talking at the other end but also indicates the processed received signal when the received signal processing part 13 is provided. k represents a discrete time index. An echo canceller 14 cancels an echo $y_1(k)$ which is produced when the received signal $x_1(k)$ from the loudspeaker 12 is picked up by a microphone 16 after propagating over an echo path 15. The echo $y_1(k)$ can be modeled as a signal which can be obtained by the following convolution with the impulse response of the echo path 15 at time k represented by $h_{11}(k,n)$:

$$y_1(k) = \Sigma h_{11}(k,n) x_1(k-n) \quad (1)$$

where $\Sigma$ indicates the summation from n=0 to L−1, L being the number of taps, which is a constant preset corresponding to the reverberation time of the echo path 15. In the first place, received signals $x_1(k)$ at times back to L−1 are stored in a received signal storage/vector generating part 17. The received signals thus stored are output as a received signal vector $x_1(k)$, which is given as follows:

$$x_1(k) = [x_1(k), x_1(k-1), \ldots, x_1(k-L+1)]^T \quad (2)$$

where $(*)^T$ indicates a transpose of vector. An echo replica generating part 18 calculates the inner product of the received signal vector $x_1(k)$ of Eq. (2) and an echo replica vector $\hat{h}_{11}(k)$ obtainable from an echo path estimating part 19 as follows:

$$\hat{y}_1(k) = \hat{h}_{11}^T(k) x_1(k) \quad (3)$$

As a result, an echo replica $\hat{y}_1(k)$ is generated. This inner product calculation is equivalent to such a convolution as Eq. (1). The echo path estimating part 19 generates the echo replica vector $\hat{h}_{11}(k)$ that is used in the echo replica generating part 18. The most common algorithm for this echo path estimation is the NLMS (Normalized Least Mean Squares) algorithm. With the NLMS algorithm, the received signal vector $x_1(k)$ at time k and a residual echo $e_1(k)$, i.e. the following error obtained by subtracting the echo replica from the output of the microphone 16 with a subtractor 21, $$e_1(k) = y_1(k) - \hat{y}_1(k) \quad (4)$$

are used to calculate an estimated echo path vector $\hat{h}_{11}(k)$ (k+1) which is used at time k+1, by the following equation:

$$\hat{h}_{11}(k+1) = \hat{h}_{11}(k) + \alpha e_1(k) x_1(k)/\{x_1^T(k) x_1(k)\} \quad (5)$$

where $\alpha$ is called a step size parameter, which is used to adjust adaptation within the range of $0<\alpha<2$. By repeating the above processing, the echo path estimating part 19 is allowed to gradually converge the estimated echo path vector $\hat{h}_{11}(k)$ toward an echo path vector $h_{11}(k)$ which has, as its elements, a time sequence of impulse responses $h_{11}(k,n)$ of the true echo path 15 given by the following equation:

$$h_{11}(k) = [h_{11}(k,0), h_{11}(k,1), \ldots, h_{11}(k,L-1)]^T \quad (6)$$

As the result of this, the residual echo $e_1(k)$ given by Eq. (4) can be reduced.

In general, a teleconference system of the type having an $N(\geq 2)$-receive-channel system and an $M(\geq 1)$-pickup-channel system employs, for echo cancellation, such a configuration as shown in FIG. 2. That is, an echo cancellation system 23 is implemented in which N-channel echo cancellers $22_1, 22_2, \ldots, 22_M$ for processing N-inputs-one-output time sequence signals are each connected between all the N channels of the receive (loudspeaker) side and one channel of the pickup (microphone) side. In this instance, the echo cancellation system 23 has a total of N×M echo paths $15_{nm}$ (where $1 \leq n \leq N$ and $1 \leq m \leq M$). The N-channel echo cancellers $22_1, 22_2, \ldots, 22_M$, which are each connected between all of the N channels of the receive side and one channel of the pickup side, have such a configuration as depicted in FIG. 3, which is an extended version of the configuration of the echo canceller 14 shown in FIG. 1. This is described in detail, for example, in B. Widrow and S. D. Stearns, "Adaptive Signal Processing," Prince-Hall, Inc., pp.198–200 (1985). Now, consider the N-channel echo canceller $22_m$ having its pickup side connected to an m-th (where $1 \leq m \leq M$) pickup channel. The echo $y_m(k)$ which is picked up by the m-th channel microphone $16m$ is created by adding together respective received signals of all receive channels at the pickup side after propagation over respective echo paths $15_{1m}$ through $15_{nm}$. Hence, it is necessary to devise how to make the echo path estimation by evaluating only one residual echo $e_m(k)$ in common to all the channels. In the first place, for the received signal $x_n(k)$ of each channel, the following received signal vectors are generated in the received signal storage/vector generating parts $17_1, 17_2, \ldots, 17_N$:

$$x_1(k) = [x_1(k), x_1(k-1), \ldots, x_1(k-L_1+1)]^T \quad (7)$$

$$x_2(k) = [x_2(k), x_2(k-1), \ldots, x_2(k-L_1+1)]^T \quad (8)$$

$$x_N(k) = [x_N(k), x_N(k-1), \ldots, x_N(k-L_N+1)]^T \quad (9)$$

where $L_1, L_2, \ldots, L_N$ are numbers of taps, which are constants preset in correspondence with the reverberation times of the echo paths $15_{1m}, 15_{2m}, \ldots, 15_{Nm}$. The vectors thus generated are combined in vector combining part 24 as follows:

$$x(k) = [x_1^T(k), x_2^T(k), \ldots, x_N^T(k)]^T \quad (10)$$

Also in the echo path estimating part $19_m$, estimated echo path vectors $\hat{h}_{1m}(k), \hat{h}_{2m}(k), \ldots, \hat{h}_{Nm}(k)$, which are used to simulate N echo paths between the respective receive channel and the m-th pickup channel, are combined as follows:

$$\hat{h}_m(k) = [\hat{h}_{1m}{}^T(k), \hat{h}_{2m}{}^T(k), \ldots, \hat{h}_{Nm}{}^T(k)]^T \quad (11)$$

In the case of using the NLSM algorithm, the updating of the combined estimated echo path vector $\hat{h}_m(k)$ is done as follows:

$$\hat{h}_m(k+1) = \hat{h}_m(k) + \alpha e_m(k) x(k) / \{x^T(k) x(k)\} \quad (12)$$

In the echo replica generating part $18_m$, an echo replica $\hat{y}_m(k)$ for the echo $y_m(k)$ picked up in the m-th pickup channel by the following inner product calculation:

$$\hat{y}_m(k) = \hat{h}_m{}^T(k) x(k) \quad (13)$$

By combining the vectors in the respective channels into one vector, the flow of basic processing becomes the same as in the one-channel echo canceller of FIG. 1.

Of the shortcomings of the conventional echo cancellation system for application to the teleconference system composed of an N-receive-channel system and an M-pickup-channel system, the shortcoming that the present invention is to solve will be described with respect to a concrete example.

In the application of the conventional echo cancellation system to a two-channel stereo teleconference system which sends and receives signals between points A and B over two channels as shown in FIG. 4, there arises a problem that each time the speaker at the point A moves or changes, acoustic echoes from the point B by the speech at the point A increases even if the echo paths on the part of the point B remain unchanged. This problem is created by an incorrect echo path estimation in the echo cancellation system on the part of the point B.

To explain this problem, attention is paid to the operation of an echo canceller $22b_1$ connected to a first pickup channel which is one of echo cancellers of two channels forming the echo cancellation system at the point B. To clarify the operation of each receive channel, each element of the afore-mentioned combined vector which corresponds to one of the receive channels will hereinafter be identified in distinct form. Let $x_1(k)$ and $x_2(k)$ represent received signal vectors in the two channels at the point B side. Letting echo path vectors of true echo paths $15_{11}$ and $15_{21}$ of the receive channels be represented by $h_{11}(k)$ and $h_{21}(k)$, respectively, an echo $y_1(k)$ which is picked up via the echo paths $15_{11}$ and $15_{21}$ is given by $$y_1(k) = h_{11}{}^T(k) x_1(k) + h_{21}{}^T(k) x_2(k) \quad (14)$$

On the other hand, an echo replica $\hat{y}_1(k)$ which is generated in the echo canceller $22b_1$ is given by the following equation using estimated echo paths $\hat{h}_{11}(k)$ and $\hat{h}_{21}(k)$ that are generated in the echo canceller $22b_1$.

$$\hat{y}_1(k) = \hat{h}_{11}{}^T(k) x_1(k) + \hat{h}_{21}{}^T(k) x_2(k) \quad (15)$$

When the same speaker speaks or utters at the point A, the received signal vectors $x_1(k)$ and $x_2(k)$ have a very strong cross-correlation. When the received signal vectors $x_1(k)$ and $x_2(k)$ have a constant cross-correlation, the combined vector $[\hat{h}_{11}{}^T(k), \hat{h}_{21}{}^T(k)]$ as the solution of the following equation exists infinitely, forming a subspace $H_x$ inhrent to the cross-correlation between the received signal vectors $x_1(k)$ and $x_2(k)$.

$$\hat{y}_1(k) = y_1(k) \quad (16)$$

On this account, in the case of using such an ordinary iterative error minimization algorithm as the NLMS algorithm, the combined vector $[\hat{h}_{11}{}^T(k), \hat{h}_{21}{}^T(k)]$ converges to a point where the distance from the initial value to the subspace $H_x$ is minimum; in general, it does not converge to the true value $[h_{11}{}^T(k), h_{21}{}^T(k)]$.

For simplicity, consider the case where the received signal vectors $x_1(k)$ and $x_2(k)$ are expressed by the following equations using constant scalar values $p_1$ and $p_2$ and the original signal vector $s(k)$.

$$x_1(k) = p_1 s(k), \quad x_2(k) = p_2 s(k) \quad (17)$$

The subspace $H_x$ where the combined vector $[\hat{h}_{11}{}^T(k), \hat{h}_{21}{}^T(k)]$ is allowed to exist can be regarded as a straight line in FIG. 5 which satisfies the following equation.

$$p_1 \hat{h}_{11}(k) + p_2 \hat{h}_{21}(k) = p_1 h_{11}(k) + p_2 h_{21}(k) \quad (18)$$

When the adaptation starts from the initial value 0, the point of convergence $[\hat{h}_{11p}{}^T(k), \hat{h}_{21p}{}^T(k)]$ is obtained as follows:

$$\hat{h}_{11p}(k) = p_1{}^2 \{h_{11}(k) + p_2 h_{21}(k)/p_1\}/(p_1{}^2 + p_2{}^2) \neq h_{11}(k) \quad (19)$$

$$\hat{h}_{21p}(k) = p_2{}^2 \{p_1 h_{11}(k)/p_2 + h_{21}(k)\}/(p_1{}^2 + p_2{}^2) \neq h_{21}(k) \quad (20)$$

Consequently, Eq. (18) is no longer satisfied upon variation in the rate between the scalar values $p_1$ and $p_2$, making echo cancellation impossible and hence resulting in an increase in the acoustic echo returning to the speaker at the other end.

As will be understood from the above, in the application of the conventional echo cancellation system to the telecommunication system composed of an N-receive-channel system and an M-pickup-channel system, if received signals of respective channels have a cross-correlation, the estimation of echo paths cannot correctly be made—this gives rise to the problem that the echo increases upon each variation in the cross-correlation between the received signals.

SUMMARY OF THE INVENTION

It is therefore an object of the present invention to provide a method and apparatus for multi-channel acoustic echo cancellation which permit echo cancellation even if received signals have the afore-mentioned cross-correlation in the conventional multi-channel acoustic echo cancellation system.

According to the principle of the present invention, the adjustment vector for the estimated echo path is derived through utilization of the input-output relationships which are actually observable when received signals of respective channels are input into echo paths after being reproduced intact as acoustic signals by loudspeakers in the corresponding channels and the outputs from the echo paths are picked up by each microphone, and approximated unknown or imaginary input-output relationships based on inputs into the echo paths when some or all of the received signals in each channel are exchanged and reproduced as acoustic signals in a different channel and outputs which are picked up by each microphone as acoustic signals after propagation over the echo paths.

The multi-channel acoustic echo cancellation method according to the present invention comprises the steps of:

(a) reproducing received signals of a plurality of channels as acoustic signals by a plurality of loudspeakers respectively corresponding thereto;

(b) adding the acoustic signals from the plurality of loudspeakers by each microphone after propagating over respective echo paths to obtain an observable echo;

(c) storing the received signals of the plurality of channels for predetermined periods of time and forming received signal vectors by the stored received signals for each channel;

(d) combining the received signal vectors in all the channels into observable combined received signal vectors;

(e) providing the combined received signal vectors to estimated echo paths having combined estimated echo path vectors which converge to combined vectors of the echo path vectors represented by impulse responses of the respective echo paths, whereby is generated an echo replica simulating the observable echo, the combined received signal vectors and the corresponding echo corresponding to the observable input-output relationships of the plurality of echo paths;

(f) subtracting the echo replica from the echo to obtain a residual echo;

(g) calculating an approximated echo replica in the case where combined exchanged received signal vectors, obtained when at least two received signals of the plurality of channels, are provided to the estimated echo paths;

(h) approximating an echo which ought to be obtained by each microphone when the received signals exchanged as in step (g) propagate thereto over the plurality of echo paths;

(i) substracting the approximated echo replica from the approximated echo to obtain an approximated residual echo;

(j) evaluating observable input-output relationships representing the relationships between the observed combined received signal vectors and the corresponding observable residual echo and approximated input-output relationships representing the relationships between the combined exchanged received signal vectors and the approximated residual echo and obtaining the adjustment vector based on the evaluation; and (k) adjusting the estimated echo path vector by the adjustment vector.

The multi-channel acoustic echo canceller according to the present invention comprises:

a plurality of loudspeakers for reproducing received signals in a plurality of channels into acoustic signals and for outputting them;

a microphone connected to at least one transmission channel, acoustic paths of the acoustic signals from the plurality of loudspeakers to the microphone forming echo paths and the acoustic signals picked up by the microphone and combined into an echo for input into the transmission channel;

a received signal vector generating part for temporarily storing the received signals of the-plurality of channels and for generating each received signal vector;

a vector combining part for combining the received signal vectors of the plurality of channels into combined received signal vectors;

an echo replica generating part supplied with the combined received signal vectors and combined estimated echo path vectors simulating the combined echo path vectors obtained by combining echo path vectors representing impulse responses of the echo paths from the plurality of loudspeakers to the microphone, for outputting an observable echo replica simulating the echo;

a subtractor for subtracting the echo replica from the echo output from the microphone and for outputting the difference as an observable residual echo;

a vector permuting/combining part for generating combined rearranged received signal vectors obtained by combining the received signals of the plurality of channels after rearranging at least two received signals of the plurality of channels; and an echo path estimating part supplied with at least the observable combined received signal vectors and the observable residual echoes corresponding thereto, for obtaining approximated echo replica in the case of applying each of the combined received signal vectors to one of the estimated echo paths, for obtaining as an approximated echo the echo to be obtained from the microphone in the case of the received signals being exchanged, for subtracting the approximated echo replica from the approximated echo to obtain an approximated residual echo, for evaluating an observable input-output relationship representing the relation between the combined received signal vector and the observable residual echo corresponding thereto and an approximated input-output relationship representing the rearranged combined received signal vector and the approximated residual echo corresponding thereto, for obtaining the adjustment vector on the basis of the evaluation, for generating an estimated echo vector obtained by adjusting the estimated each path vector with the adjustment vector, for providing it to the echo replica gengenerating part.

DESCRIPTION OF THE PREFERRED EMBODIMENTS

PRINCIPLE

Figure 1:
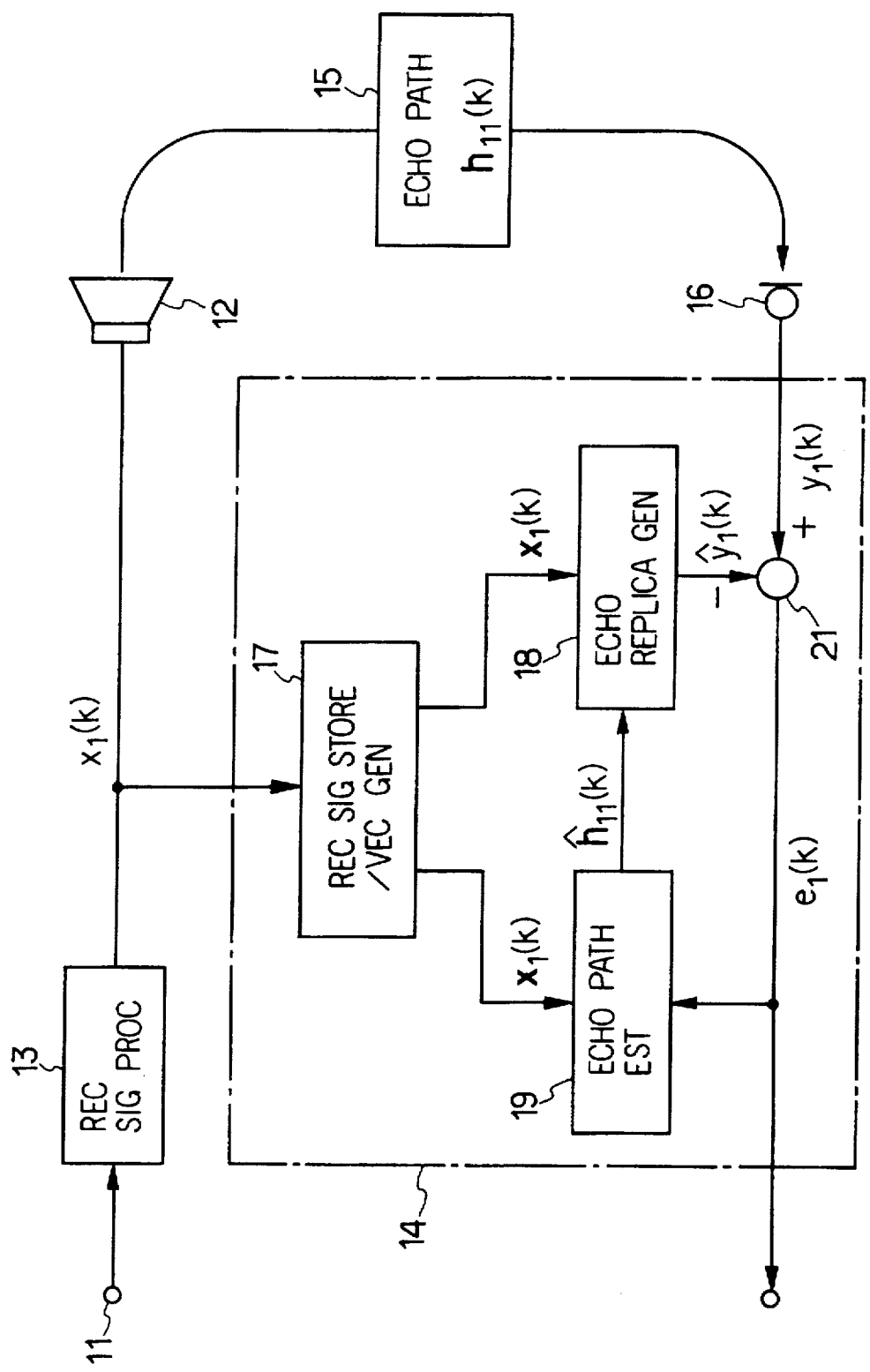
FIG. 1 is a block diagram showing a one-channel echo canceller.

To facilitate a better understanding of the present invention, its principle will be described first in connection with a two-receive-channel system for the sake of brevity. As described previously with reference to FIGS. 4 and 5, when the received signals $x_1(k)$ and $x_2(k)$ are reproduced, then propagate over the corresponding echo paths $h_{1m}(k)$ and $h_{2m}(k)$ and are picked up as an echo $y_m(k)$ in the m-th pickup channel (m=2 in FIG. 4), the input-output relationship in this instance is given as follows:

$$y_m(k) = h_{1m}{}^T(k)x_1(k) + h_{2m}{}^T(k)x_2(k) \quad (21)$$

When the cross-correlation between the received signal vectors $x_1(k)$ and $x_2(k)$ is constant, it is impossible to uniquely determine estimated echo path vectors $\hat{h}_{1m}(k)$ and $\hat{h}_{2m}(k)$ which satisfy the relationship of Eq. (21), as referred to previously. Now, assuming that an echo $y'_m(k)$ is observed in the m-th pickup channel that corresponds to received signal vectors $x'_1(k)$ and $x'_2(k)$ having a cross-correlation different from that between the received signal vectors $x_1(k)$ and $x_2(k)$, the following relationship is obtained as is the case with Eq. (21).

$$y'_m(k) = h_{1m}{}^T(k)x'_1(k) + h_{2m}{}^T(k)x'_2(k) \quad (22)$$

Letting echo replicas for the m-th pickup channel when supplied with the pairs of received signals $x_1(k)$, $x_2(k)$ and $x'_1(k)$, $x'_2(k)$ be represented by $\hat{y}_m(k)$ and $\hat{y}'_m(k)$, they are given as follows.

$$\hat{y}_m(k) = \hat{h}_{1m}{}^T(k)x_1(k) + \hat{h}_{2m}{}^T(k)x_2(k) \quad (23)$$

$$\hat{y}'_m(k) = \hat{h}_{1m}{}^T(k)x'_1(k) + \hat{h}_{2m}{}^T(k)x'_2(k) \quad (24)$$

Further, letting error signals between the echoes $y_m(k)$, $y'_m(k)$ and the echo replicas $\hat{y}_m(k)$, $\hat{y}'_m(k)$ be represented by $e_m(k)$ and $e'_m(k)$, respectively, and echo path estimation error vectors between the echo paths $h_{1m}(k)$ and $h_{2m}(k)$ and estimated echo path vectors $\hat{h}_{1m}(k)$, $\hat{h}_{2m}(k)$ represented by $\Delta h_{1m}(k)$ and $\Delta h_{2m}(k)$, respectively, the error vectors are given by the following equations.

$$\begin{aligned} e_m(k) &= y_m(k) - \hat{y}_m(k) \\ &= (h_{1m}^T(k) - \hat{h}_{1m}^T(k))x_1(k) + (h_{2m}^T(k) - \hat{h}_{2m}^T(k))x_2(k) \\ &= \Delta h_{1m}^T(k)x_1(k) + \Delta h_{2m}^T(k)x_2(k) \end{aligned} \quad (25)$$

$$\begin{aligned} e'_m(k) &= y'_m(k) - \hat{y}'_m(k) \\ &= (h_{1m}^T(k) - \hat{h}_{1m}^T(k))x'_1(k) + (h_{2m}^T(k) - \hat{h}_{2m}^T(k))x'_2(k) \\ &= \Delta h_{1m}^T(k)x'_1(k) + \Delta h_{2m}^T(k)x'_2(k) \end{aligned} \quad (26)$$

That is, the following relationships are obtained.

$$\begin{pmatrix} x_1^T(k) & x_2^T(k) \\ x_1'^T(k) & x_2'^T(k) \end{pmatrix} \begin{pmatrix} \Delta h_{1m}(k) \\ \Delta h_{2m}(k) \end{pmatrix} = \begin{pmatrix} e_m(k) \\ e'_m(k) \end{pmatrix} \quad (27)$$

The echo path estimation error vectors $\Delta h_{1m}(k)$ and $\Delta h_{2m}(k)$ cannot uniquely be derived from Eq. (27), but letting its minimum-norm solutions be represented by $\Delta \hat{h}_{1m}(k)$ and $\Delta \hat{h}_{2m}(k)$, respectively, the following relationship is obtained.

$$\begin{pmatrix} \Delta \hat{h}_{1m}(k) \\ \Delta \hat{h}_{2m}(k) \end{pmatrix} = \begin{pmatrix} x_1^T(k) & x_2^T(k) \\ x_1'^T(k) & x_2'^T(k) \end{pmatrix}^+ \begin{pmatrix} e_m(k) \\ e'_m(k) \end{pmatrix} \quad (28)$$

where $(*)^+$ indicates a generalized inverse matrix. Thus, the estimated echo vectors $\hat{h}_{1m}(k)$ and $\hat{h}_{2m}(k)$ can be adjusted using the minimum-norm solutions $\Delta \hat{h}_{1m}(k)$ and $\Delta \hat{h}_{2m}(k)$ as adjustment vectors as follows:

$$\hat{h}_{1m}(k+1) = \hat{h}_{1m}(k) + \mu_m \Delta \hat{h}_{1m}(k) \quad (29)$$

$$\hat{h}_{2m}(k+1) = \hat{h}_{2m}(k) + \mu_m \Delta \hat{h}_{2m}(k) \quad (30)$$

where $\mu_m$ is a step size parameter. In this case, the adjustment vectors $\Delta \hat{h}_{1m}(k)$ and $\Delta \hat{h}_{2m}(k)$ are allowed to have a cross-correlation different from that between the received signals $x_1(k)$ and $x_2(k)$, and hence it is possible to estimate the characteristic of the true echo path independently of the cross-correlation between the received signals. However, the above discussion presupposes that the input-output relationship for the received signals $x'_1(k)$ and $x'_2(k)$ having a cross-correlation different from that between the received signals $x_1(k)$ and $x_2(k)$, expressed by Eq. (22), could be observed. In practice, this input-output relationship is unknown. The present invention utilizes the condition in which this input-output relationship is approximately satisfied.

It is possible to use, as the received signals $x'_1(k)$ and $x'_2(k)$, arbitrary signals having a cross-correlation different from that between the received signals $x_1(k)$ and $x_2(k)$. Now, to approximately satisfy the input-output relationship given by Eq. (22), consider the case where received signals of two channels are exchanged or reversed and reproduced as follows:

$$x'_1(k) = x_2(k) \quad (31)$$

$$x'_2(k) = x_1(k) \quad (32)$$

That is, when the cross-correlation between the received signals $x_1(k)$ and $x_2(k)$ is 1:2, for instance, the received signals $x'_1(k)$ and $x'_2(k)$ resulting from the channel exchange have a different cross-correlation 2:1. According to the present invention, when received signals of multiple channels are reproduced, an adjustment vector is obtained by solving the combination of exchanged or reversed received signals of two channels as shown by Eq. (28). A description will be given of several methods for obtaining the adjustment vectors $\Delta\hat{h}_{1m}(k)$ and $\Delta\hat{h}_{2m}(k)$ on this principle.

METHOD 1

Method 1 uses different weights to evaluate the observable input-output relationship expressed by Eq. (21) and the input-output relationship of Eq. (22) which is inferred to be approximately obtained by the signal exchange based on Eqs. (31) and (32). For example, error signals $e_m(k)$ and $e'_m(k)$ are evaluated with different weights. This weighting is divided into two: a fixed, time-invariant weight and a time-varying weight.

Method (1-a)

For example, in the case of a two-receive-channel system, the adjustment vectors are obtained by introducing weighting coefficients $\gamma_m$ and $\gamma'_m$ to evaluate the errors $e_m(k)$ and $e'm(k)$ in Eq. (27) with different weights and solving the following equation.

$$\begin{pmatrix} x_1^T(k) & x_2^T(k) \\ x_1'^T(k) & x_2'^T(k) \end{pmatrix} \begin{pmatrix} \Delta h_{1m}(k) \\ \Delta h_{2m}(k) \end{pmatrix} = \begin{pmatrix} \gamma_m e_m(k) \\ \gamma_m' e'_m(k) \end{pmatrix} \quad (33)$$

Method (1-b)

The error $e'_m(k)$ is separated into a component are correlated with the error $e_m(k)$ and a component decorrelated therewith and then weighting coefficients are introduced. For example, noting the correlation between received signals, the signals $x'_1(k)$ and $x'_2(k)$ can be separated into a portion correlated with the received signals $x_1(k)$ and $x_2(k)$ (second term on the right-hand side of Eq. (34)) and the other portion (first term on the right-hand side of Eq. (34)) as expressed as follows:

$$\begin{pmatrix} x'_1(k) \\ x'_2(k) \end{pmatrix} = \left\{ \begin{pmatrix} x'_1(k) \\ x'_2(k) \end{pmatrix} - \frac{r'(k)}{r(k)} \begin{pmatrix} x_1(k) \\ x_2(k) \end{pmatrix} \right\} + \frac{r'(k)}{r(k)} \begin{pmatrix} x_1(k) \\ x_2(k) \end{pmatrix} \quad (34)$$

$$r'(k) = x_1^T(k)x'_1(k) + x_2^T(k)x'_2(k) \quad (35)$$

$$r(k) = x_1^T(k)x_1(k) + x_2^T(k)x_2(k) \quad (36)$$

Further, by multiplying the both sides of Eq. (34) by $[\Delta h_{1m}^T(k), \Delta h_{2m}^T(k)]$ from the left-hand side and using the relationships of Eqs. (25) and (26), the error $e'_m(k)$ becomes as follows:

$$e'_m(k) = \left\{ e'_m(k) - \frac{r'(k)}{r(k)} e_m(k) \right\} + \frac{r'(k)}{r(k)} e_m(k) \quad (37)$$

From the viewpoint of the correlation between the received signals, the error $e'_m(k)$ is separated into the component correlated with the error $e_m(k)$ (second term on the right-hand side of Eq. (37)) and the other component (first term on the right-hand side of Eq. (37)). By this, Eq. (27) becomes as follows:

$$\begin{pmatrix} x_1^T(k) & x_2^T(k) \\ x_1'^T(k) & x_2'^T(k) \end{pmatrix} \begin{pmatrix} \Delta h_{1m}(k) \\ \Delta h_{2m}(k) \end{pmatrix} = \begin{pmatrix} e_m(k) \\ \left\{ e'_m(k) - \frac{r'(k)}{r(k)} e_m(k) \right\} + \frac{r'(k)}{r(k)} e_m(k) \end{pmatrix} \quad (38)$$

Then, the component of the error $e'_m(k)$ correlated with the error $e_m(k)$ and the other component are multiplied by coefficients v and w independently, by which Eq. (38) becomes as follows:

$$\begin{pmatrix} x_1^T(k) & x_2^T(k) \\ x_1'^T(k) & x_2'^T(k) \end{pmatrix} \begin{pmatrix} \Delta h_{1m}(k) \\ \Delta h_{2m}(k) \end{pmatrix} = \begin{pmatrix} e_m(k) \\ v\left\{ e'_m(k) - \frac{r'(k)}{r(k)} e_m(k) \right\} + w \frac{r'(k)}{r(k)} e_m(k) \end{pmatrix} \quad (39)$$

This equation is solved to obtain the adjustment vectors.

As shown by Eq. (39), by separating the error $e'm(k)$ into the component correlated with the error $em(k)$ and decorrelated component and weighting the respective components independently of each other, the resulting adjustment vectors match those obtainable with the aforementioned NLMS algorithm when setting v=0 and w=1. Further, setting v=1 and w=0 has a physical meaning which corresponds to the calculation of the adjustment vectors on the basis of that component of the error $e'_m(k)$ obtained converning the approximated input-output relationships which is not correlated with the error $e_m(k)$ obtained concerning the observable input-output relationships.

One possible method that is employed in the case of varying the weighting coefficients with time as mentioned above is to vary them in accordance with the degree of convergence of the estimated echo path vector to the true echo path vector as will be described later on. For example, in Method (1-a), the weighting coefficient $\gamma_m(k)$ is chosen to be equal to 1 and $\gamma'_m(k)$ smaller than 1, whereas when the degree of simulation of the true echo path is low, the weighting coefficient $\gamma'_m(k)$ is chosen to be larger but not in excess of 1. In Method (1-b), when the degree of simulation is low, the coefficients v and w are set to 0 and 1, respectively, as in the past, and as the degree of simulation increases, the values of the coefficients v and w are varied accordingly.

To evaluate the degree of simulation, use is made of at least one of the ratio between the echo $y_m(k)$ and the residual echo (i.e. error signal) $e_m(k)$, the average power ratio between the echo and the residual echo, the absolute value of the residual echo and the average power of the residual echo.

METHOD 2

Next, a description will be given of a concrete method for obtaining the vectors $\Delta h_{1m}(k)$ and $\Delta h_{2m}(k)$ in Eq. (28) in the description of the principle of the present invention or Eqs. (33) and (39) in Methods (1-a) and (1-b).

Unknown input-output relationships approximated between inputs into echo paths when some or all of the received signals of respective channels are exchanged and reproduced as acoustic signals from channels different from their original channels and outputs to be produced when the above inputs are picked up as echo signals by microphones after propagation over the corresponding echo paths. This approximation is made through utilization of known input-output relationships actually observed when the received signals $x_m(k)$ of respective channels are reproduced intact as acoustic signals and picked up by microphones after propagating over the corresponding echo paths, the residual echo (an error signal) for the evaluation of the input-output relationships and the similarity of the echo paths. This can be done by such concrete methods as described below.

Method (2-a)

This method utilizes the similarity of echo paths on the assumption that equivalent echo paths are formed between loudspeakers and microphones of physical arrangements similar in terms of the distance therebetween and their orientation. For example, when the receive and the pickup system are both two-channel, the input-output relationships for the respective pickup channels are as follows:

$$y_1(k)=h_{11}{}^T(k)x_1(k)+h_{21}{}^T(k)x_2(k) \tag{40}$$

$$y_2(k)=h_{12}{}^T(k)x_1(k)+h_{22}{}^T(k)x_2(k) \tag{41}$$

Figure 6:
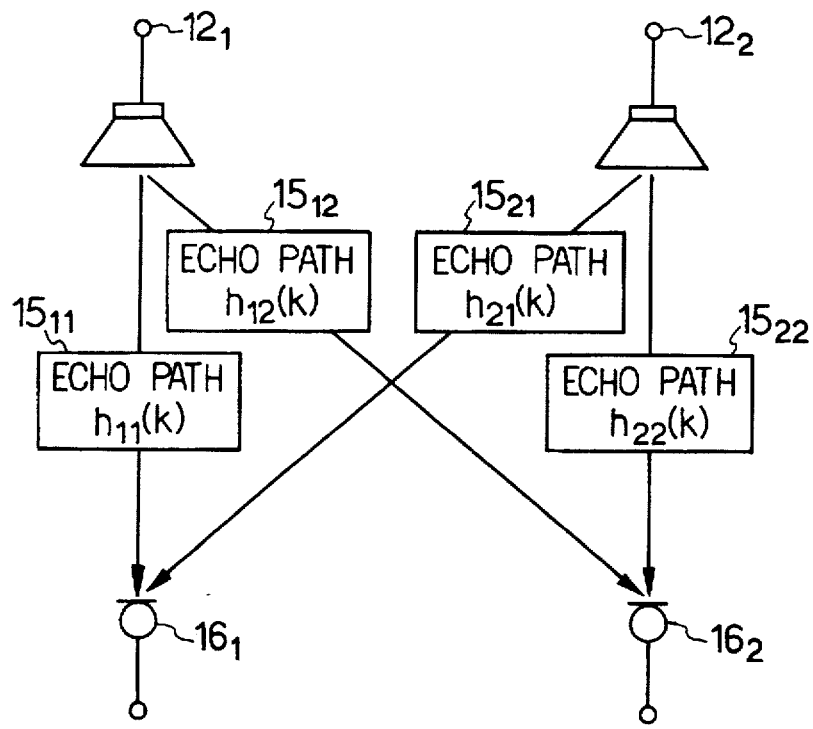
FIG. 6 is a diagram illustrating an example of a symmetrical arrangement of microphones and loudspeakers in a stereo telecommunication system.

Now, supposing that when loudspeakers $12_1$, $12_2$ and microphones 16, and 16 are arranged bilaterally symmetrical, including their directional patterns, as shown in FIG. 6, the following equations hold $$h_{11}(k)=h_{22}(k) \tag{42}$$

$$h_{21}(k)=h_{12}(k) \tag{43}$$

From these equations and Eqs. (40) and (41), the following relationships can be derived.

$$y'_1(k)=h_{11}{}^T(k)x_2(k)+h_{21}{}^T(k)x_1(k)=y_2(k) \tag{44}$$

$$y'_2(k)=h_{12}{}^T(k)x_2(k)+h_{22}{}^T(k)x_1(k)=y_1(k) \tag{45}$$

These relationships are indeed the input-output relationships which are obtained when the receive channels are exchanged; hence, $e'_1(k)=e_2(k)$ and $e'_2(k)=e_1(k)$ hold. By applying these approximated results to Eqs. (28), (33) and (39) as well as (44) and (45), three methods could be obtained as described below.

Method (2-a-1)

By applying the channel exchange and the echo path approximation to Eq. (28), the following simultaneous equations are obtained, and by solving Eq. (46), the adjustment vectors can be obtained.

$$\begin{bmatrix} \Delta\hat{h}_{11}(k) \\ \Delta\hat{h}_{21}(k) \\ \Delta\hat{h}_{12}(k) \\ \Delta\hat{h}_{22}(k) \end{bmatrix} = \begin{bmatrix} x_1^T(k) & x_2^T(k) & 0 & 0 \\ x_2^T(k) & x_1^T(k) & 0 & 0 \\ 0 & 0 & x_1^T(k) & x_2^T(k) \\ 0 & 0 & x_2^T(k) & x_1^T(k) \end{bmatrix} + \begin{bmatrix} e_1(k) \\ e_2(k) \\ e_2(k) \\ e_1(k) \end{bmatrix} \tag{46}$$

Method (2-a-2)

By applying the channel exchange and the echo path approximation to Eq. (33), the following simultaneous equations are obtained, and by solving Eq. (47), the adjustment vectors can be obtained.

$$\begin{bmatrix} x_1^T(k) & x_2^T(k) & 0 & 0 \\ x_2^T(k) & x_1^T(k) & 0 & 0 \\ 0 & 0 & x_1^T(k) & x_2^T(k) \\ 0 & 0 & x_2^T(k) & x_1^T(k) \end{bmatrix} \begin{bmatrix} \Delta\hat{h}_{11}(k) \\ \Delta\hat{h}_{21}(k) \\ \Delta\hat{h}_{12}(k) \\ \Delta\hat{h}_{22}(k) \end{bmatrix} = \begin{bmatrix} \gamma_1 e_1(k) \\ \gamma_1 e_2(k) \\ \gamma_2 e_2(k) \\ \gamma_2 e_1(k) \end{bmatrix} \tag{47}$$

Method (2-a-3)

Setting $c(k)=\gamma'(k)\gamma^{-1}(k)$ and applying the channel exchange and the echo path approximation to Eq. (39), the following simultaneous equations are obtained, and by solving Eq. (48), the adjustment vectors are obtained.

$$\begin{bmatrix} x_1^T(k) & x_2^T(k) & 0 & 0 \\ x_2^T(k) & x_1^T(k) & 0 & 0 \\ 0 & 0 & x_1^T(k) & x_2^T(k) \\ 0 & 0 & x_2^T(k) & x_1^T(k) \end{bmatrix} \begin{bmatrix} \Delta\hat{h}_{11}(k) \\ \Delta\hat{h}_{21}(k) \\ \Delta\hat{h}_{12}(k) \\ \Delta\hat{h}_{22}(k) \end{bmatrix} = \tag{48}$$

$$\begin{bmatrix} e_1(k) \\ v_1\{e_2(k)-c(k)e_1(k)\}+w_1c(k)e_1(k) \\ e_2(k) \\ v_2\{e_1(k)-c(k)e_2(k)\}+w_2c(k)e_2(k) \end{bmatrix}$$

Method 2-b)

Another method (2-b) is one that can be used even if the afore-mentioned assumption in Method (2-a), for example, the assumption that the echo paths between loudspeaker and microphones of similar physical arrangements are the same, as in the case of Eqs. (42) and (43), does not hold with high accuracy. When the receive and the pickup system are both two-channel as is the case with the above, the following equations are used in place of Eqs. (42) and (43).

$$h_{11}(k)=h_{22}(k)+f_1(k) \tag{49}$$

$$h_{21}(k)=h_{12}(k)+f_2(k) \tag{50}$$

where $f_1(k)$ and $f_2(k)$ represent a similarity error between the true echo path vectors $h_{11}(k)$ and $h_{22}(k)$ and a similarity error between the true echo path vectors $h_{12}(k)$ and $h_{21}(k)$, respectively. On the other hand, a similarity error $\hat{f}_1(k)$ between the estimated echo path vectors $\hat{h}_{11}(k)$ and $\hat{h}_{22}(k)$ and a similarity error $\hat{f}_2(k)$ between the estimated echo path vectors $\hat{h}_{12}(k)$ and $\hat{h}_{21}(k)$ are expressed as follows:

$$\hat{h}_{11}(k)=\hat{h}_{22}(k)+\hat{f}_1(k) \tag{51}$$

$$\hat{h}_{21}(k)=\hat{h}_{12}(k)+\hat{f}_2(k) \tag{52}$$

Further, the differences between the similarity errors of the true and estimated echo paths are defined by the following equations:

$$\Delta f_1(k)=f_1(k)-\hat{f}_1(k) \tag{53}$$

$$\Delta f_2(k)=f_2(k)-\hat{f}_2(k) \tag{54}$$

These differences will hereinafter be referred to as similarity error differences. Then, letting $y'_1(k)$ and $y'_2(k)$ be outputs which are obtained in the first and second pickup channels when reproducing the received signals $x_1(k)$ and $x_2(k)$ after exchanging the receive channels, the following equations are obtained using the relationships of Eqs. (49), (50) and Eqs. (40), (41).

$$\begin{aligned} y'_1(k) &= h_{11}^T(k)x_2(k) + h_{21}^T(k)x_1(k) \\ &= y_2(k) + f_1^T(k)x_2(k) + f_2^T(k)x_1(k) \end{aligned} \tag{55}$$

$$\begin{aligned} y'_2(k) &= h_{12}^T(k)x_2(k) + h_{22}^T(k)x_1(k) \\ &= y_1(k) - f_2^T(k)x_1(k) - f_1^T(k)x_2(k) \end{aligned} \tag{56}$$

The outputs $y'_1(k)$ and $y'_2(k)$ are simulated to be $\hat{y}'_1(k)$ and $\hat{y}'_2(k)$ by the following equations, using the estimated echo path vectors $\hat{h}_{11}(k)$, $\hat{h}_{21}(k)$, $\hat{h}_{12}(k)$, $\hat{h}_{22}(k)$ and Eqs. (51), (52).

$$\hat{y}'_1(k) = \hat{h}_{11}^T(k)x_2(k) + \hat{h}_{21}^T(k)x_1(k) \quad (57)$$
$$= \hat{y}_2(k) + \hat{f}_1^T(k)x_2(k) + \hat{f}_2^T(k)x_1(k)$$
$$\hat{y}'_2(k) = \hat{h}_{12}^T(k)x_2(k) + \hat{h}_{22}^T(k)x_1(k) \quad (58)$$
$$= \hat{y}_1(k) - \hat{f}_1^T(k)x_1(k) - \hat{f}_2^T(k)x_2(k)$$

Errors $e'_1(k)$ and $e'_2(k)$ between the outputs $y'_1(k)$, $y'_2(k)$ and their simulated values $\hat{y}'_1(k)$, $\hat{y}'_2(k)$ are given as follows:

$$e'_1(k) = \Delta\hat{h}_{11}^T(k)x_2(k) + \Delta\hat{h}_{21}^T(k)x_1(k) \quad (59)$$
$$= e_2(k) + \Delta\hat{f}_1^T(k)x_2(k) + \Delta\hat{f}_2^T(k)x_1(k)$$
$$e'_2(k) = \Delta\hat{h}_{12}^T(k)x_2(k) + \Delta\hat{h}_{22}^T(k)x_1(k) \quad (60)$$
$$= e_1(k) - \Delta\hat{f}_1^T(k)x_1(k) - \Delta\hat{f}_2^T(k)x_2(k)$$

where:

$$e_1(k) = y_1(k) - \hat{y}_1(k) \quad (61)$$
$$e_2(k) = y_2(k) - \hat{y}_2(k) \quad (62)$$
$$\Delta\hat{f}_1(k) = f_1(k) - \hat{f}_1(k) \quad (63)$$
$$\Delta\hat{f}_2(k) = f_2(k) - \hat{f}_2(k) \quad (64)$$

Since the similarity error differences $\Delta\hat{f}_1(k)$ and $\Delta\hat{f}_2(k)$ are expressed in Eqs. (63) and (64) as unknown similarity error vectors $f_1(k)$ and $f_2(k)$, respectively, the errors $e'1(k)$ and $e'2(k)$ cannot correctly be known. Then, solving Eqs. (59) and (60) for the known errors $e_2(k)$ and $e_1(k)$, we have $$e_2(k) = \Delta\hat{h}_{11}^T(k)x_2(k) + \Delta\hat{h}_{21}^T(k)x_1(k) - \Delta\hat{f}_1^T(k)x_2(k) - \Delta\hat{f}_2^T(k)x_1(k) \quad (65)$$

$$e_1(k) = \Delta\hat{h}_{12}^T(k)x_2(k) + \Delta\hat{h}_{22}^T(k)x_1(k) + \Delta\hat{f}_1^T(k)x_1(k) + \Delta\hat{f}_2^T(k)x_2(k) \quad (66)$$

On the other hand, the following equations are obtained from Eq. (25).

$$e_1(k) = \Delta\hat{h}_{11}^T(k)x_1(k) + \Delta\hat{h}_{21}^T(k)x_2(k) \quad (67)$$
$$e_2(k) = \Delta\hat{h}_{12}^T(k)x_1(k) + \Delta\hat{h}_{22}^T(k)x_2(k) \quad (68)$$

Therefore, the following simultaneous equations are obtained from Eqs. (65) through (68).

$$\begin{bmatrix} x_1^T(k) & x_2^T(k) & 0 & 0 & 0 & 0 \\ x_2^T(k) & x_1^T(k) & 0 & 0 & -x_2^T(k) & -x_1^T(k) \\ 0 & 0 & x_1^T(k) & x_2^T(k) & 0 & 0 \\ 0 & 0 & x_2^T(k) & x_1^T(k) & x_1^T(k) & x_2^T(k) \end{bmatrix} \begin{bmatrix} \Delta\hat{h}_{11}(k) \\ \Delta\hat{h}_{21}(k) \\ \Delta\hat{h}_{12}(k) \\ \Delta\hat{h}_{22}(k) \\ \Delta\hat{f}_1(k) \\ \Delta\hat{f}_2(k) \end{bmatrix} = \begin{bmatrix} e_1(k) \\ e_2(k) \\ e_2(k) \\ e_1(k) \end{bmatrix} \quad (69)$$

The adjustment vectors of the estimated echo paths are obtained as minimum-norm solutions of the simultaneous equations of Eq. (69). In this case, the similarity error differences $\Delta\hat{f}_1(k)$ and $\Delta\hat{f}_2(k)$ need not calculated in practice.

Method (2-b-1)

In the calculation of the estimated echo path adjustment vectors based on Eq. (69), the introduction of the weighting coefficients in Eq. (33) gives $$\begin{bmatrix} x_1^T(k) & x_2^T(k) & 0 & 0 & 0 & 0 \\ x_2^T(k) & x_1^T(k) & 0 & 0 & -\gamma_1 x_2^T(k) & -\gamma_1 x_1^T(k) \\ 0 & 0 & x_1^T(k) & x_2^T(k) & 0 & 0 \\ 0 & 0 & x_2^T(k) & x_1^T(k) & \gamma_2 x_1^T(k) & \gamma_2 x_2^T(k) \end{bmatrix} \begin{bmatrix} \Delta\hat{h}_{11}(k) \\ \Delta\hat{h}_{21}(k) \\ \Delta\hat{h}_{12}(k) \\ \Delta\hat{h}_{22}(k) \\ \Delta\hat{f}_1(k) \\ \Delta\hat{f}_2(k) \end{bmatrix} = \begin{bmatrix} \gamma_1 e_1(k) \\ \gamma_1 e_2(k) \\ \gamma_2 e_2(k) \\ \gamma_2 e_1(k) \end{bmatrix} \quad (70)$$

In this instance, the weighting coefficients are applied following Eqs. (59) and (60) as follows:

$$\gamma_1 e'_1(k) = \gamma_1 e_2(k) + \gamma_1 \Delta\hat{f}_1^T(k)x_2(k) + \gamma_1 \Delta\hat{f}_2^T(k)x_1(k) \quad (71)$$

$$\gamma_2 e'_2(k) = \gamma_2 e_1(k) + \gamma_2 \Delta\hat{f}_1^T(k)x_1(k) + \gamma_1 \Delta\hat{f}_2^T(k)x_2(k) \quad (72)$$

Method (2-b-2)

This method introduces time-invariant or time-varying weighting coefficients which permit control of the influence of the echo path similarity error vectors. For example, when the receive and pickup systems are both two-channel, the evaluation of the afore-mentioned similarity error differences $\Delta\hat{f}_1(k)$ and $\Delta\hat{f}_2(k)$ is weighted with respect to the evaluation of the estimated echo path vectors $\Delta\hat{h}_{11}(k)$, $\Delta\hat{h}_{21}(k)$, $\Delta\hat{h}_{12}(k)$, $\Delta\hat{h}_{22}(k)$. For example, introducing into Eq. (63) weighting coefficients $k_1$, $k_2$, $k_3$ and $k_4$ as elements by which the similarity error differences $\Delta\hat{f}_1(k)$ and $\Delta\hat{f}_2(k)$, we have $$\begin{bmatrix} x_1^T(k) & x_2^T(k) & 0 & 0 & 0 & 0 \\ x_2^T(k) & x_1^T(k) & 0 & 0 & -\kappa_1\gamma_1 x_2^T(k) & -\kappa_2\gamma_1 x_1^T(k) \\ 0 & 0 & x_1^T(k) & x_2^T(k) & 0 & 0 \\ 0 & 0 & x_2^T(k) & x_1^T(k) & \kappa_3\gamma_2 x_1^T(k) & \kappa_4\gamma_2 x_2^T(k) \end{bmatrix} \begin{bmatrix} \Delta\hat{h}_{11}(k) \\ \Delta\hat{h}_{21}(k) \\ \Delta\hat{h}_{12}(k) \\ \Delta\hat{h}_{22}(k) \\ \Delta\hat{f}_1(k) \\ \Delta\hat{f}_2(k) \end{bmatrix} = \begin{bmatrix} \gamma_1 e_1(k) \\ \gamma_1 e_2(k) \\ \gamma_2 e_2(k) \\ \gamma_2 e_1(k) \end{bmatrix} \quad (73)$$

In this instance, if $\|\hat{h}_{11}(k)-\hat{h}_{22}(k)\|/\|\hat{h}_{11}(k)\|$ is small, then it is inferred from Eqs. (46) and (47) that the similarity error vector $f_1(k)$ is small; hence, if the above ratio is smaller than a predetermined threshold value K1, for instance, control is effected to make the weighting coefficient $k_1$ smaller than 1, for example. Similarly, when $\|\hat{h}_{21}(k)-\hat{h}_{12}(k)\|/\|\hat{h}_{21}(k)\|$ is smaller than a predetermined threshold value K2, control is effected to make the weighting coefficient $k_2$ smaller than 1, for instance.

Method (2-b-3)

According to this method, introducing weighting coefficients v1, v2, w1 and w2 based on Method (1-b) into Eq. (69) based on Method (2-b) and setting $c(k)=r'(k)r^{-1}(k)$, we have $$\begin{bmatrix} x_1^T(k) & x_2^T(k) & 0 & 0 & 0 & 0 \\ x_2^T(k) & x_1^T(k) & 0 & 0 & -v_1 x_2^T(k) & -v_1 x_1^T(k) \\ 0 & 0 & x_1^T(k) & x_2^T(k) & 0 & 0 \\ 0 & 0 & x_2^T(k) & x_1^T(k) & v_2 x_1^T(k) & v_2 x_2^T(k) \end{bmatrix} \begin{bmatrix} \Delta\hat{h}_{11}(k) \\ \Delta\hat{h}_{21}(k) \\ \Delta\hat{h}_{12}(k) \\ \Delta\hat{h}_{22}(k) \\ \Delta\hat{f}_1(k) \\ \Delta\hat{f}_2(k) \end{bmatrix} = \begin{bmatrix} e_1(k) \\ v_1\{e_2(k) - c(k)e_1(k)\} + w_1 c(k)e_1(k) \\ e_2(k) \\ v_2\{e_1(k) - c(k)e_2(k)\} + w_2 c(k)e_2(k) \end{bmatrix} \quad (74)$$

By setting the following equations (75) and (76) and solving simultaneous equations (73), the adjustment vectors can be obtained.

$$r'(k)=x_1^T(k)x_2(k)+x_2^T(k)x_1(k) \quad (75)$$

$$r(k)=x_1^T(k)x_1(k)+x_2^T(k)x_2(k) \quad (76)$$

METHOD 3

A third method derives the adjustment vectors of the estimated echo path vectors by evaluating, in combination, the input-output relationships obtained by approximating those observed previously and the input-output relationship obtained by approximating those observed at the current time.

Method (3-a)

In concrete terms, a projection algorithm is applied to methods (2-a) and (2-b) which utilize the afore-mentioned channel exchange. The projection algorithm is to adjust the estimated echo path vectors so that the input-output relationships in an n-th received signal channel at the current and previous time $p_n$ are satisfied simultaneously, where $p_n$ is an integer that does not exceed the number of taps L of each estimated echo path vector. In the first place, the n-th channel received signal vectors from the current time back to the previous time $p_n$ are generically expressed as follows:

$$x_n^{(p)}(k)=[x_n(k), x_n(k-1), \ldots, x_n(k-p+1)] \quad (77)$$

Again, when the receive and pickup systems are both two-channel, setting error signals as follows:

$$e_1^{(p_1)}(k)=[e_1(k),(1-\mu_1)e_1(k-1), \ldots ,(1-\mu_1)^{p_1-1}e_1(k-p_1+1)]^T \quad (78)$$

$$e_2^{(p'_1)}(k)=[e_2(k),(1-\mu_2)e_2(k-1), \ldots ,(1-\mu_2)^{p'_1-1}e_2(k-p'_1+1)]^T \quad (79)$$

$$e_1^{(p_2)}(k)=[e_2(k),(1-\mu_1)e_2(k-1), \ldots ,(1-\mu_2)^{p_2-1}e_2(k-p_2+1)]^T \quad (80)$$

$$e_1^{(p'_2)}(k)=[e_1(k),(1-\mu_1)e_1(k-1), \ldots ,(1-\mu_1)^{p'_2-1}e_1(k-p'_2+1)]^T \quad (81)$$

and applying the projection algorithm to Eq. (73), we have $$\begin{bmatrix} X_1^{(p_1)T}(k) & X_2^{(p_1)T}(k) & 0 & 0 & 0 & 0 \\ X_2^{(p'_1)T}(k) & X_1^{(p'_1)T}(k) & 0 & 0 & -\kappa_1\gamma_1 X_2^{(p'_1)T}(k) & -\kappa_2\gamma_1 X_1^{(p'_1)T}(k) \\ 0 & 0 & X_1^{(p_2)T}(k) & X_2^{(p_2)T}(k) & 0 & 0 \\ 0 & 0 & X_2^{(p'_2)T}(k) & X_1^{(p'_2)T}(k) & \kappa_3\gamma_2 X_1^{(p'_2)T}(k) & \kappa_4\gamma_2 X_2^{(p'_2)T}(k) \end{bmatrix} \times \begin{bmatrix} \Delta\hat{h}_{11}(k) \\ \Delta\hat{h}_{21}(k) \\ \Delta\hat{h}_{12}(k) \\ \Delta\hat{h}_{22}(k) \\ \Delta\hat{f}_1(k) \\ \Delta\hat{f}_2(k) \end{bmatrix} = \begin{bmatrix} \gamma_1 e_1^{(p_1)}(k) \\ \gamma_1 e_1^{(p'_1)}(k) \\ \gamma_2 e_1^{(p_2)}(k) \\ \gamma_2 e_1^{(p'_2)}(k) \end{bmatrix} \quad (82)$$

Let it be assumed that parameters for determining how far back to the previous time for using the input-output relationships can be set independently within the ranges in which they do not individually exceed the numbers of taps L of the estimated echo path vectors just like $p_1$, $p'_1$, $p_2$ and $p'_2$ which satisfy a condition $\min\{p_1,p_2\} \geq \max\{p'_1,p'_2\}$.

Method (3-b)

Applying the projection algorithm using Eqs. (77) through (81) to Eq. (73) based on Method (2-b-3) and setting a matrix for the cross-correlation as follows:

$$C_1(k)=R'_{(p'_1 \times p_1)}(k)R^{-1}_{(p_1 \times p_1)}(k)$$

$$C_2(k)=R'_{(p'_2 \times p_2)}(k)R^{-1}_{(p_2 \times p_2)}(k) \quad (83)$$

we have $$\begin{bmatrix} X_1^{(p_1)T}(k) & X_2^{(p_1)T}(k) & 0 & 0 & 0 & 0 \\ 0 & 0 & 0 & 0 & 0 & 0 \\ X_1^{(p'_1)T}(k) & X_2^{(p'_1)T}(k) & X_1^{(p_2)T}(k) & X_2^{(p_2)T}(k) & -v_1 X_1^{(p'_1)T}(k) & -v_1 X_2^{(p'_1)T}(k) \\ 0 & 0 & X_1^{(p'_2)T}(k) & X_2^{(p'_2)T}(k) & v_2 X_1^{(p'_2)T}(k) & v_2 X_2^{(p'_2)T}(k) \end{bmatrix} \times \quad (84)$$

$$\begin{bmatrix} \Delta\hat{h}_{11}(k) \\ \Delta\hat{h}_{21}(k) \\ \Delta\hat{h}_{12}(k) \\ \Delta\hat{h}_{22}(k) \\ \Delta\hat{f}_1(k) \\ \Delta\hat{f}_2(k) \end{bmatrix} = \begin{bmatrix} e_1^{(p_1)}(k) \\ v_1\{e_2^{(p'_1)}(k) - C_1(k)e_1^{(p'_1)}(k)\} + w_1 C_1(k)e_1^{(p'_1)}(k) \\ e_2^{(p_2)}(k) \\ v_2\{e_1^{(p'_2)}(k) - C_2(k)e_2^{(p'_2)}(k)\} + w_2 C_2(k)e_2^{(p'_2)}(k) \end{bmatrix}$$

The adjustment vectors are obtained as the minimum-norm solution of the above simultaneous equation (84). The n-th channel received signal vectors back to the previous time p are generically expressed as follows:

$$x_n^{(p)}(k) = [x_n(k), x_n(k-1), \ldots, x_n(k-p+1)] \quad (85)$$

The parameters for determining how far back to the previous time for using the input-output relationships are set as $p_1$, $p'_1$, $p_2$ and $p'_2$, which satisfy the condition $\min\{p_1, p_2\} \geq \max\{p'_1, p'_2\}$ and are given as follows:

$$R'_{(p'_1 \times p_1)}(k) = X_1^{(p'_1)T}(k)X_2^{(p_1)}(k) + X_2^{(p'_1)T}(k)X_1^{(p_1)}(k) \quad (86)$$

$$R'_{(p'_2 \times p_2)}(k) = X_1^{(p'_2)T}(k)X_2^{(p_2)}(k) + X_2^{(p'_2)T}(k)X_1^{(p_2)}(k) \quad (87)$$

$$R_{(p_1 \times p_1)}(k) = X_1^{(p_1)T}(k)X_1^{(p_1)}(k) + X_2^{(p_1)T}(k)X_2^{(p_1)}(k) \quad (88)$$

$$R_{(p_2 \times p_2)}(k) = X_1^{(p_2)T}(k)X_1^{(p_2)}(k) + X_2^{(p_2)T}(k)X_2^{(p_2)}(k) \quad (89)$$

$$e_1^{(p_1)}(k) = [e_1(k), (1-\mu_1)e_1(k-1), \ldots, (1-\mu_1)^{p_1-1}e_1(k-p_1+1)]^T \quad (90)$$

$$e_2^{(p'_1)}(k) = [e_2(k), (1-\mu_2)e_2(k-1), \ldots, (1-\mu_2)^{p'_1-1}e_2(k-p'_1+1)]^T \quad (91)$$

$$e_2^{(p_2)}(k) = [e_2(k), (1-\mu_2)e_2(k-1), \ldots, (1-\mu_2)^{p_2-1}e_2(k-p_2+1)]^T \quad (92)$$

$$e_1^{(p'_2)}(k) = [e_1(k), (1-\mu_1)e_1(k-1), \ldots, (1-\mu_1)^{p'_2-1}e_1(k-p'_2+1)]^T \quad (93)$$

Method (3-b-1)

As is the case with Eq. 84), the adjustment vectors can also be obtained by introducing the time-invariant or time-varying weighting coefficients $k_1$, $k_2$, $k_3$ and $k_4$, which permit control the influence of the echo path similarity error vectors in Method (2-b-2), into Eq. (84) of Method (3-b) as follows:

Method (3-b-2)

It is also possible to obtain the adjustment vectors by introducing weighting coefficients $\lambda_1$ and $\lambda_2$ into Eq. (93) as follows:

$$\begin{bmatrix} X_1^{(p_1)T}(k) & X_2^{(p_1)T}(k) & 0 & 0 & 0 & 0 \\ 0 & 0 & 0 & 0 & 0 & 0 \\ X_1^{(p'_1)T}(k) & X_2^{(p'_1)T}(k) & X_1^{(p_2)T}(k) & X_2^{(p_2)T}(k) & -\kappa_1 v_1 X_1^{(p'_1)T}(k) & -\kappa_2 v_1 X_2^{(p'_1)T}(k) \\ 0 & 0 & X_1^{(p'_2)T}(k) & X_2^{(p'_2)T}(k) & \kappa_3 v_2 X_1^{(p'_2)T}(k) & \kappa_4 v_2 X_2^{(p'_2)T}(k) \end{bmatrix} \times \quad (94)$$

$$\begin{bmatrix} \Delta\hat{h}_{11}(k) \\ \Delta\hat{h}_{21}(k) \\ \Delta\hat{h}_{12}(k) \\ \Delta\hat{h}_{22}(k) \\ \Delta\hat{f}_1(k) \\ \Delta\hat{f}_2(k) \end{bmatrix} = \begin{bmatrix} e_1^{(p_1)}(k) \\ v_1\{e_2^{(p'_1)}(k) - C_1(k)e_1^{(p'_1)}(k)\} + w_1 C_1(k)e_1^{(p'_1)}(k) \\ e_2^{(p_2)}(k) \\ v_2\{e_1^{(p'_2)}(k) - C_2(k)e_2^{(p'_2)}(k)\} + w_2 C_2(k)e_2^{(p'_2)}(k) \end{bmatrix}$$

$$\begin{bmatrix} X_1^{(\nu1)T}(k) & X_2^{(\nu1)T}(k) & 0 & 0 & 0 & 0 \\ & & 0 & 0 & -\kappa_1\nu_1 X_1^{(\nu1)T}(k) & -\kappa_2\nu_1 X_1^{(\nu1)T}(k) \\ X_1^{(\nu1)T}(k) & X_1^{(\nu1)T}(k) & X_1^{(\nu2)T}(k) & X_2^{(\nu2)T}(k) & 0 & 0 \\ 0 & 0 & X_1^{(\nu2)T}(k) & X_1^{(\nu2)T}(k) & \kappa_3\nu_2 X_1^{(\nu2)T}(k) & \kappa_4\nu_2 X_2^{(\nu2)T}(k) \end{bmatrix} \times \tag{95}$$

$$\begin{bmatrix} \Delta\hat{h}_{11}(k) \\ \Delta\hat{h}_{21}(k) \\ \Delta\hat{h}_{12}(k) \\ \Delta\hat{h}_{22}(k) \\ \Delta\hat{f}_1(k) \\ \Delta\hat{f}_2(k) \end{bmatrix} = \begin{bmatrix} e_1^{(p1)}(k) \\ \lambda_1\nu_1\{e_2^{(p1)}(k) - C_1(k)e_1^{(p1)}(k)\} + w_1C_1(k)e_1^{(p1)}(k) \\ e_1^{(p2)}(k) \\ \lambda_2\nu_2\{e_2^{(p2)}(k) - C_2(k)e_2^{(p2)}(k)\} + w_2C_2(k)e_1^{(p2)}(k) \end{bmatrix}$$

and by controlling the weighting in accordance with the balance between the weighting coefficients $k_1$, $k_2$, $k_3$, $k_4$ and $\lambda_1$, $\lambda_2$.

METHOD 4

In the various methods described above, an ES (exponentially weighted step-size) algorithm can be further applied with which it is possible to provide different adjustment weighting coefficients for each tap on the basis of the exponential decay property of impulse responses of the echo path.

For example, setting Eq. (33) in Method (1-a) as follows:

$$M(k) = \begin{bmatrix} x_1^T(k) & x_2^T(k) \\ x_1'^T(k) & x_2'^T(k) \end{bmatrix} \tag{96}$$

Eq. (33) becomes as follows:

$$M(k)\begin{bmatrix} \Delta\hat{h}_{1m}(k) \\ \Delta\hat{h}_{2m}(k) \end{bmatrix} = \begin{bmatrix} \gamma_m e_m(k) \\ \gamma_m e'_m(k) \end{bmatrix} \tag{97}$$

The minimum-norm solution of this simultaneous equations is given by $$\begin{bmatrix} \Delta\hat{h}_{1m}(k) \\ \Delta\hat{h}_{2m}(k) \end{bmatrix} = M^T(k)[M(k)M^T(k) + \delta I]^{-1} \begin{bmatrix} \gamma_m e_m(k) \\ \gamma_m e'_m(k) \end{bmatrix} \tag{98}$$

where I is a unit matrix and $\delta$ is a small constant for stablizing the inverse matrix operation. To apply the ES algorithm to the above equation (98), a basic exponential decay matrix $A^{(r)}$ is prepared which is expressed by $$A^{(r)} = \begin{bmatrix} \alpha_1^{(r)} & & & 0 \\ & \alpha_2^{(r)} & & \\ & & \ddots & \\ 0 & & & \alpha_L^{(r)} \end{bmatrix} \tag{99}$$

where:

$$\alpha_i^{(r)} = \alpha^{(r)}(\lambda^{(r)})^{i-1}, \; i=1, \ldots, L \tag{100}$$

$$0 < \lambda^{(r)} \leq 1$$

Alternatively, L sequences of numbers given by Eq. (100) are divided into equally or unequally spaced blocks and the value of each $\alpha^{(r)}_i$ in each block is made equal to the value of the first $\alpha^{(r)}_i$ in the same block, by which the basic exponential decay matrix $A^{(r)}$ is obtained in a simplified form which has an advantage in terms of computational complexity. The matrix is set as follows:

$$A = \begin{bmatrix} A^{(1)} & 0 \\ 0 & A^{(2)} \end{bmatrix} \tag{101}$$

This is applied to Eq. (97) as follows:

$$\begin{bmatrix} \Delta\hat{h}_{1m}(k) \\ \Delta\hat{h}_{2m}(k) \end{bmatrix} = AM^T(k)[M(k)AM^T(k) + \delta I]^{-1} \begin{bmatrix} \gamma_m e_m(k) \\ \gamma_m e'_m(k) \end{bmatrix} \tag{102}$$

From the minimum-norm solution thus obtained, the adjustment vectors of the respective estimated echo path vectors are derived.

Similarly, if the following equation is set for Eq. (82) in Method (3-a) employing the afore-mentioned projection algorithm $$M(k) =$$

$$\begin{bmatrix} X_1^{(\nu1)T}(k) & X_2^{(\nu1)T}(k) & 0 & 0 & 0 & 0 \\ & & 0 & 0 & -\kappa_1\gamma_1 X_1^{(\nu1)T}(k) & -\kappa_2\gamma_1 X_1^{(\nu1)T}(k) \\ X_1^{(\nu1)T}(k) & X_1^{(\nu1)T}(k) & X_1^{(\nu2)T}(k) & X_2^{(\nu2)T}(k) & 0 & 0 \\ 0 & 0 & X_1^{(\nu2)T}(k) & X_1^{(\nu2)T}(k) & \kappa_3\gamma_2 X_1^{(\nu2)T}(k) & \kappa_4\gamma_2 X_2^{(\nu2)T}(k) \end{bmatrix} \tag{103}$$

Eq. (82) becomes as follows:

$$M(k)\begin{bmatrix} \Delta\hat{h}_{11}(k) \\ \Delta\hat{h}_{21}(k) \\ \Delta\hat{h}_{12}(k) \\ \Delta\hat{h}_{22}(k) \\ \Delta\hat{f}_1(k) \\ \Delta\hat{f}_2(k) \end{bmatrix} = \begin{bmatrix} \gamma_1 e_1^{(p1)}(k) \\ \gamma_1 e_2^{(p1)}(k) \\ \gamma_2 e_1^{(p2)}(k) \\ \gamma_2 e_2^{(p2)}(k) \end{bmatrix} \tag{104}$$

The minimum-norm solution of this simultaneous equations is given by $$\begin{bmatrix} \Delta \hat{h}_{11}(k) \\ \Delta \hat{h}_{21}(k) \\ \Delta \hat{h}_{12}(k) \\ \Delta \hat{h}_{22}(k) \\ \Delta \hat{f}_1(k) \\ \Delta \hat{f}_2(k) \end{bmatrix} = M^T(k) [M(k) M^T(k) + \delta I]^{-1} \begin{bmatrix} \gamma_1 e_1^{(1)}(k) \\ \gamma_1 e_2^{(1)}(k) \\ \gamma_2 e_1^{(2)}(k) \\ \gamma_2 e_2^{(2)}(k) \end{bmatrix} \quad (105)$$

To apply the ES algorithm to this, the following matrix is generated which is composed of the basic exponential decay matrix $A^{(r)}$.

$$A = \begin{bmatrix} A^{(1)} & & & & & 0 \\ & A^{(2)} & & & & \\ & & A^{(3)} & & & \\ & & & A^{(4)} & & \\ & & & & A^{(5)} & \\ 0 & & & & & A^{(6)} \end{bmatrix} \quad (106)$$

This is applied to Eq. (104) as follows:

$$\begin{bmatrix} \Delta \hat{h}_{11}(k) \\ \Delta \hat{h}_{21}(k) \\ \Delta \hat{h}_{12}(k) \\ \Delta \hat{h}_{22}(k) \\ \Delta \hat{f}_1(k) \\ \Delta \hat{f}_2(k) \end{bmatrix} = AM^T(k) [M(k) AM^T(k) + \delta I]^{-1} \begin{bmatrix} \gamma_1 e_1^{(1)}(k) \\ \gamma_1 e_2^{(1)}(k) \\ \gamma_2 e_1^{(2)}(k) \\ \gamma_2 e_2^{(2)}(k) \end{bmatrix} \quad (107)$$

The minimum-norm solution thus obtained is used to obtain the adjustment vectors of the estimated echo path vectors. It is apparent that the ES algorithm can similarly be applied to the other methods, and no description will be given of them.

As described above, according to the multi-channel acoustic echo cancellation method of the present invention, unknown input-output relationships between imaginary inputs in the case where some or all of the multi-channel received signals are exchanged and then reproduced as acoustic signals from channels different from their original channels and imaginary outputs which ought to be obtained when the imaginary inputs are observed as echoes by microphones after propagating over the corresponding echo paths are obtained approximately. The approximated input-output relationships and input-output relationships, which are observed when received signals of respective channels are reproduced intact as acoustic signals and are picked up by microphones after propagation over the corresponding echo paths as in the prior art, are both evaluated to obtain the adjustment vectors of the estimated echo paths—this speeds up the estimation of the true echo path in the echo path estimating part.

Echo Canceller

Figure 2:
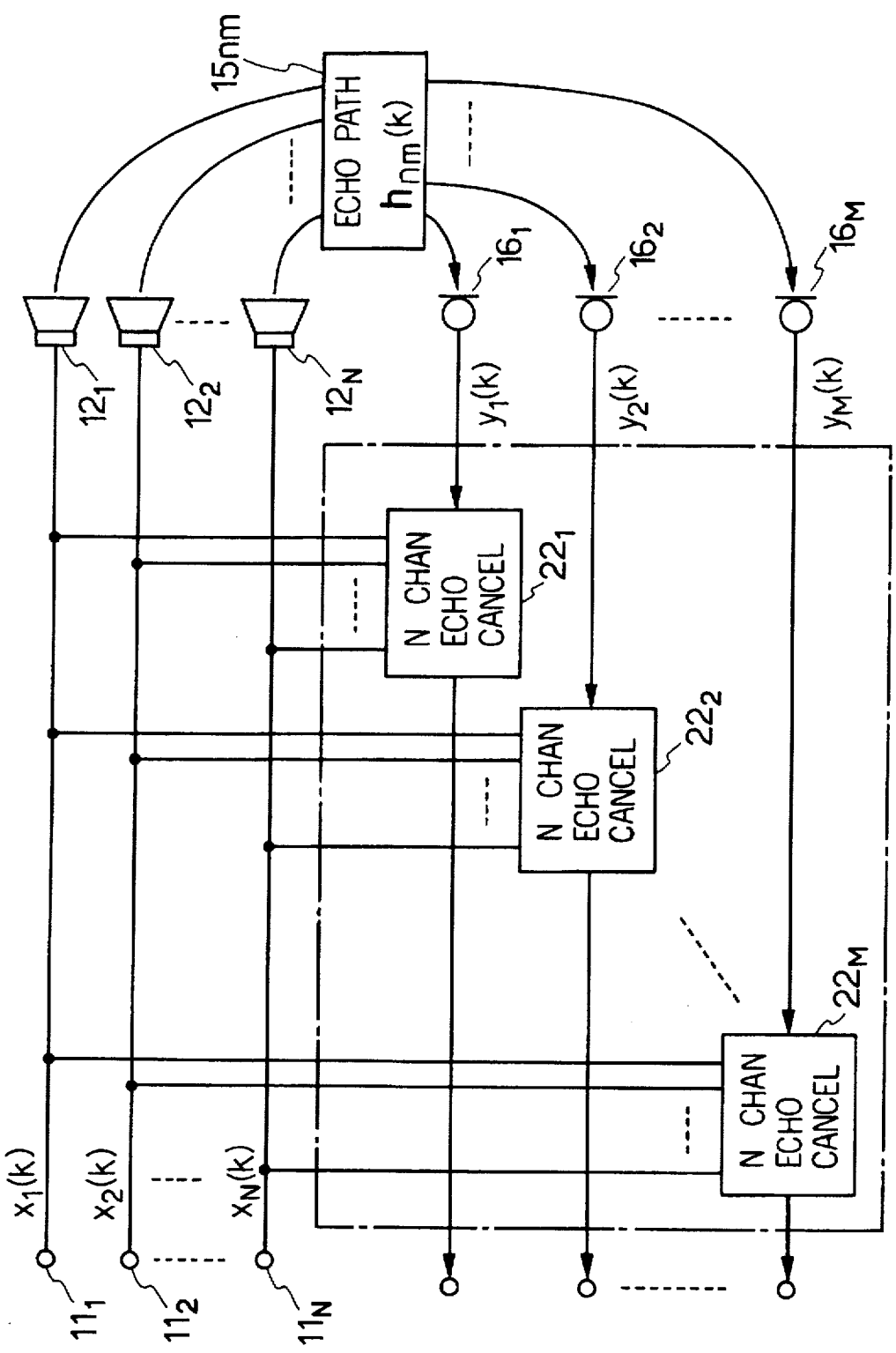
FIG. 2 is a block diagram showing a multi-channel acoustic echo cancellation system.
Figure 7:
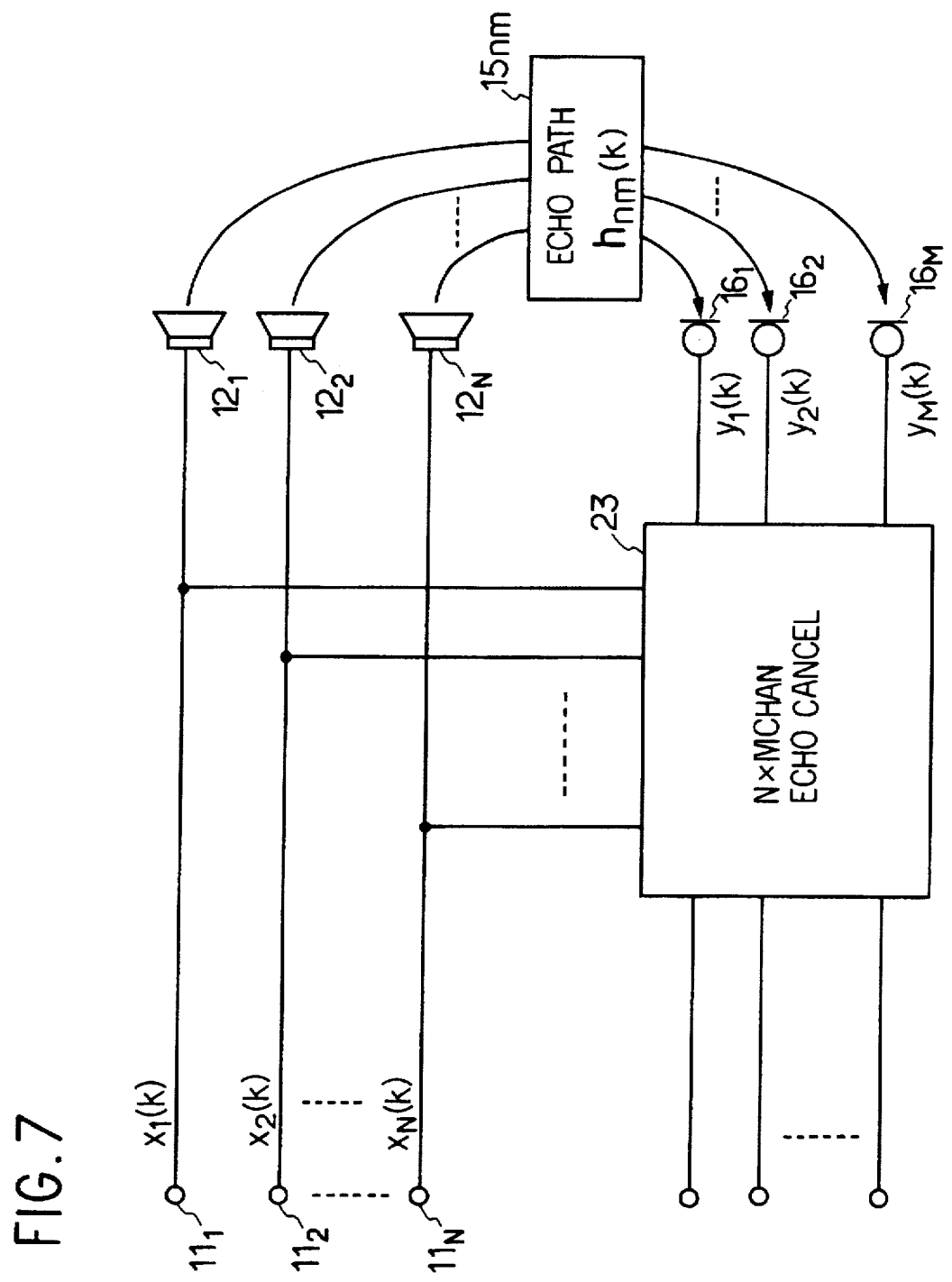
FIG. 7 is a block diagram illustrating an example of the multi-channel acoustic echo cancellation system embodying the present invention.

Next, examples of the echo cancellers embodying the above-described methods of the present invention will be described in comparison with conventional device configurations. The conventional echo cancellation system having an N-receive-channel system and an M-pickup-channel system is formed by providing N-channel echo cancellers $22_1$, $22_2$, ..., $22_M$ independently of M pickup channels as shown in FIG. 2. In contrast thereto, according to the present invention, the echo cancellation system with the N-receive-channel system and the M-pickup-channel system is formed as an N×M channel echo canceller 23 as depicted in FIG. 7, which is adapted to exchange information between channels and make the echo path estimation as shown in detail in FIG. 8.

Figure 3:
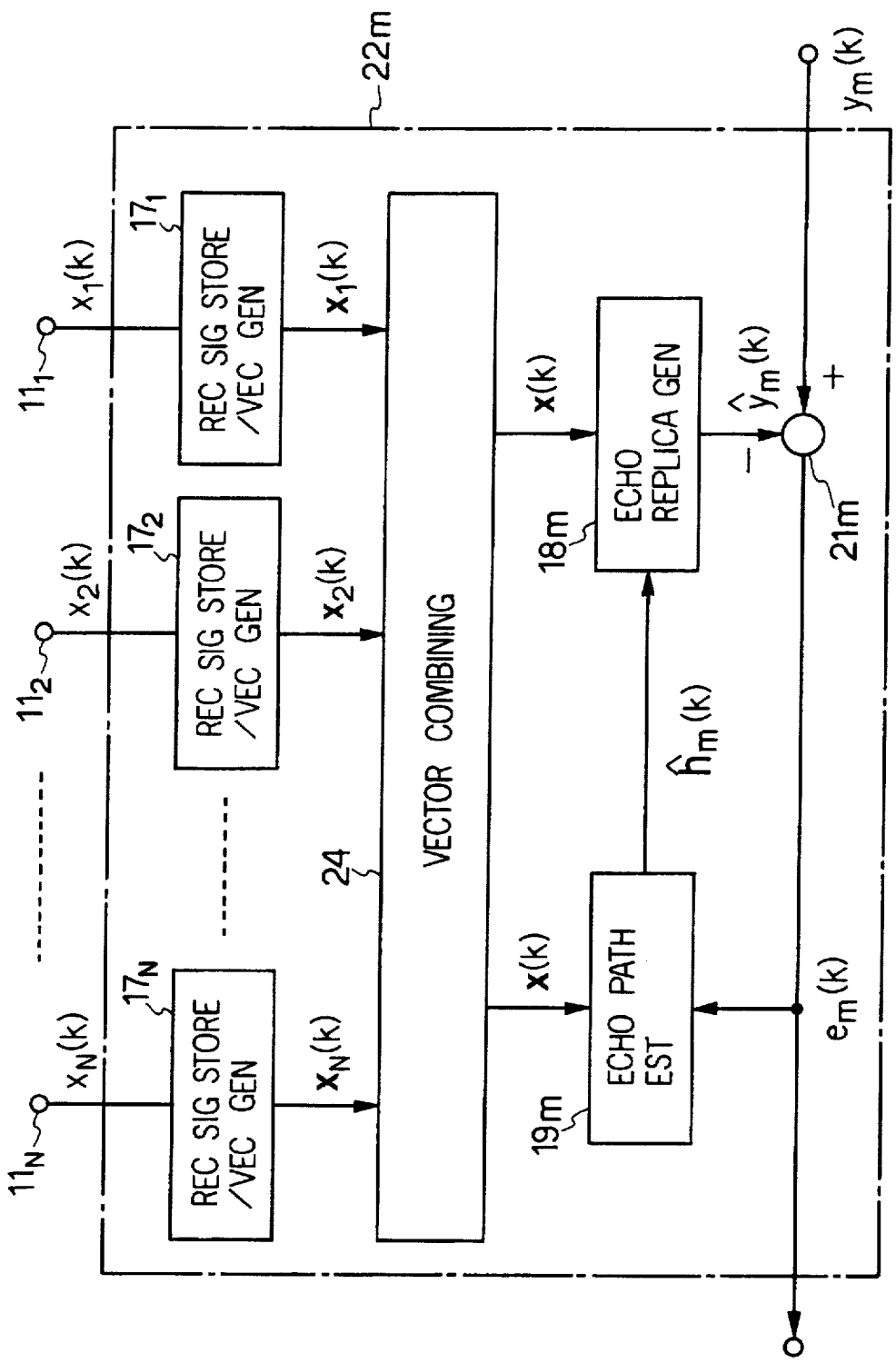
FIG. 3 is a block diagram showing a conventional multi-channel echo canceller.
Figure 8:
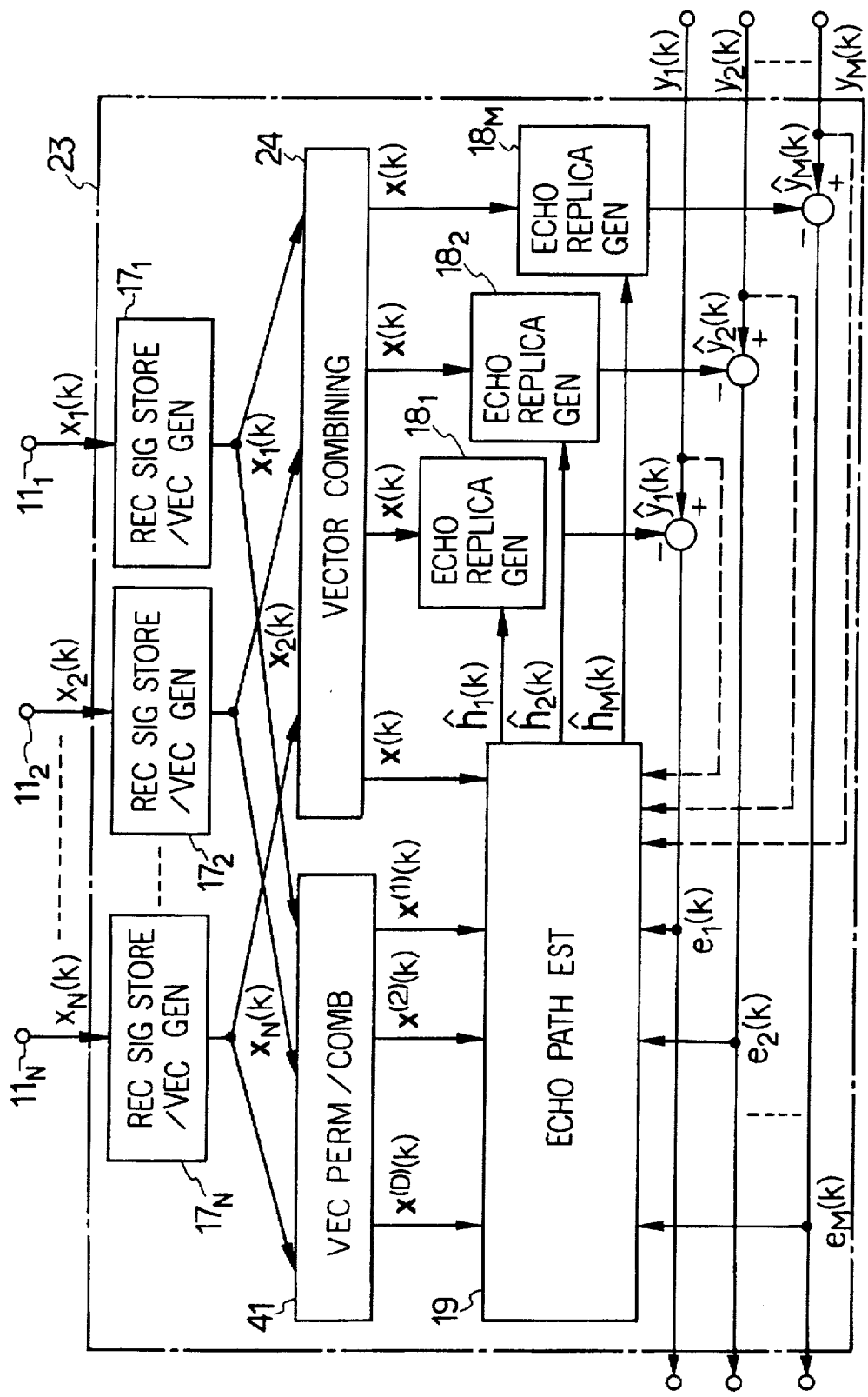
FIG. 8 is a block diagram illustrating, by way of example, the configuration of the multi-channel echo canceller embodying this invention method.

The configuration of the echo canceller shown in FIG. 8 is the basic configuration that is applicable to any of Methods 1 to 4 of the present invention, and as will be described below, this configuration features a vector permuting/combining part, 41 in comparison with the echo path estimating part $19_m$ in the prior art example of FIG. 3. In the vector computing/combining part 41, the received signal vectors $x_1(k)$, $x_2(k)$, ... are arranged in D ways by rearranging them through their exchange with received signal vectors of other channels, and these vectors are combined into D vectors $x^{(1)}(k)$, $x^{(2)}(k)$, ... $x^{(D)}(k)$. By approximating the input-output relationships for the combined vectors $x^{(1)}(k)$, $x^{(2)}(k)$, ... $x^{(D)}(k)$ through use of the similarity of echo paths, estimated echo path adjustment vectors $\Delta \hat{h}_1(k)$, ..., $\Delta \hat{h}_M(k)$ can be obtained.

The N×M channel echo canceller has N received signal storage/vector generating parts $17_1$ to $17_N$ corresponding to N channels as shown in FIG. 8, which hold L received signals up to the current time (k) determined for the respective received signal channels and generate the received signal vectors $x_1(k)$ to $x_N(k)$ expressed by Eqs. (7) to (9) as is the case with the received signal storage/vector generating parts $17_1$ to $17_N$ in FIG. 3. The received signal vectors $x_1(k)$ to $x_N(k)$ thus obtained are combined by a vector combining part 24 into the combined vectors x(k) expressed by Eq. (10), which are provided to echo replica generating parts $18_1$ to $18_M$. The echo replica generating part $18_m$ (where m=1 . . . ,M) for each m-th pickup channel calculates an echo replica by Eq. (13) from the combined vector x(k) and the combined estimated echo path vector $\hat{h}_m(k)$ and provides the echo replica $\hat{y}_m(k)$ to a subtractor $21_m$. Each subtractor $21_m$ outputs the difference between the echo $y_m(k)$ and the echo replica $\hat{y}_m(k)$ as the residual echo (i.e. an error signal) $e_m(k)$.

As mentioned previously, what is characteristic of the echo canceller according to the present invention is the vector computing/combining part 41, which rearranges the N-channel received signal vectors $x_1(k)$ to $x_N(k)$ in D ways by exchanging the received signal vectors of the respective channels, then combines the received signals of the D orders of arrangement into D combined vectors $x^{(1)}(k)$, $x^{(2)}(k)$, ... $x^{(D)}(k)$ by Eq. (10) as is the case with the vector combining part 24 and provides the D combined vectors to the echo path estimating part 19. The echo path estimating part 19 is supplied with the D combined vectors $x^{(1)}(k)$ to $x^{(D)}(k)$, the combined vector x(k) from the vector combining part 24, the error signals $e_1(k)$ to $e_M(k)$ from the subtractors $21_1$ to $21_M$ and, if necessary, the echoes $y_1(k)$ to $y_M(k)$ as indicated by the broken lines. The echo path estimating part 19 calculates the estimated echo path adjustment vectors $\Delta \hat{h}_1(k)$, ..., $\Delta \hat{h}_M(k)$ by any one of the afore-mentioned methods and further calculates the estimated echo path vectors $\hat{h}_1(k+1)$ to $\hat{h}_M(k+1)$ at the next time (k+1) by Eqs. (29) and (30), for instance.

Figure 9:
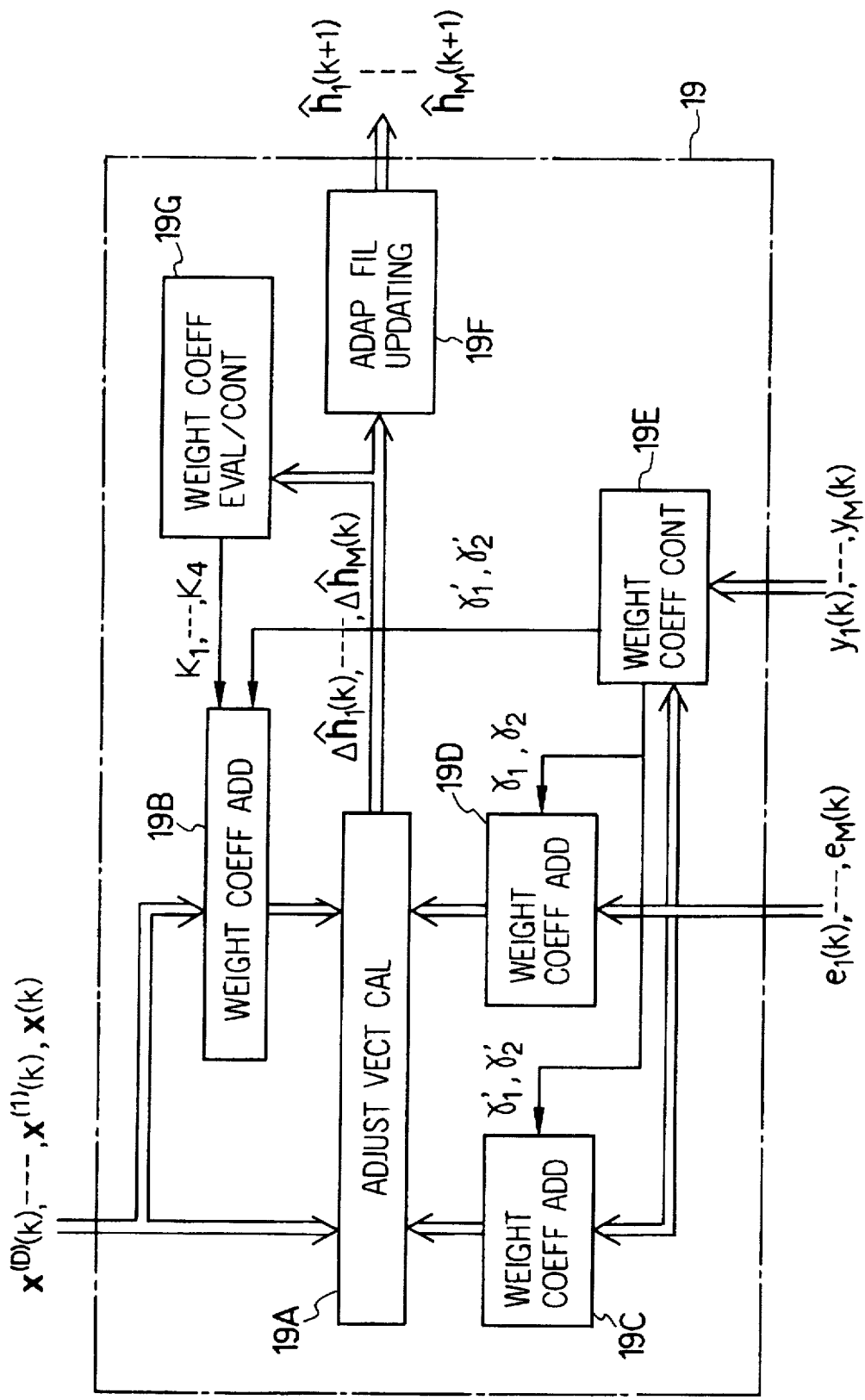
FIG. 9 is a functional block diagram illustrating the configuration of an echo path estimating part in FIG. 8.

FIG. 9 is a functional block diagram of the echo path estimating part 19 for use in the execution of the aforementioned methods (1-a), (2-a-1), (2-a-2), (2-b-10, (2-b-2) and (3-a) which involve assigning the coefficients $\gamma_m$ and $\gamma'_m$ to the error signals $e_m(k)$ and $e'_m(k)$. The combined vectors $x^{(1)}(k)$ to $x^{(D)}(k)$ from the vector permuting/combining part 24 and the combined vectors x(k) are provided to an adjustment vector calculating part 19A and a weighting coefficient assigning part 19B as well.

A weighting coefficient control part 19E introduces, by Method (1-a), the weighting coefficients $\gamma_m$ and $\gamma'_m$ into the measured and approximated input-output relationships, respectively, then changes the weighting coefficients in accordance with the degree of convergence of the estimated echo path vector to the true echo path and provides the weighting coefficients to weighting coefficient assigning parts 19B, 19C and 19D. That is, the weighting coefficient control part 19E in this example, takes thereinto the echoes $y_1(k)$ to $y_M(k)$ together with the error signals $e_1(k)$ to $e_M(k)$, then calculates their average power ratio $$r_{pm} = \overline{|y_m(k)|^2/|e_m(k)|y^2}$$

as an index representing the degree of convergence of the estimated echo path vector and, based on the value of the index, determines the weighting coefficients $\gamma_m$ and $\gamma'_m$. The weighting coefficient $\gamma_m$ in Eq. (33), (70), (73), or (82) is always set at 1, for instance, and when the power ratio $r_{pm}$ becomes larger than a predetermined positive value $r_{th}$, the weighting coefficient $\gamma'_m$ is set at a predetermined large positive value which does not exceed 1, and when the power ratio $r_{pm}$ is equal to or smaller than the predetermined positive value $r_{th}$, the weighting coefficient $\gamma'_m$ is set at a predetermined small positive value which does not exceed 1 either. A weighting coefficient evaluation and control part 19G is used in the case of Method (2-b-2); it determines, based on the adjustment vector $\Delta \hat{f}(k)$, the weighting coefficients $k_1$, $k_2$, $k_3$ and $k_4$ for controlling the influence of the echo path similarity error vector $\Delta f$ and provides the weighting coefficients to the weighting coefficient assigning part 19B. The weighting coefficient assigning part 19B assigns the received signal vectors $x_1^T$ and $x_2^T$ with weights by combinations of the weighting coefficients $k_1$ to $k_4$ and $\gamma_1$, $\gamma_2$ as shown in Eq. (66) and provides them to the adjustment vector calculating part 19A. The weighting coefficients assigning parts 19C and 19D assign the weighting coefficients $\gamma'_1$, $\gamma'_2$ and $\gamma_1$, $\gamma_2$ to the error signals $e_1(k)$ and $e_2(k)$ and provide them to the adjustment vector calculating part 19A. The adjustment vector calculating part 19A uses the signals applied thereto to solve any one of Eqs. (33), (70), (73) and (84), thereby obtaining the adjustment vector $\Delta \hat{h}_{mn}(k)$, which is provided to an adaptive filter updating part 19F. The adaptive filter updating part 19F adjusts the estimated echo path vector by Eqs. (29) and (30), then outputs it as the estimated echo path vector at time (k+1) and provides it to each of the echo replica generating parts $18_1$ to $18_M$.

Figure 10:
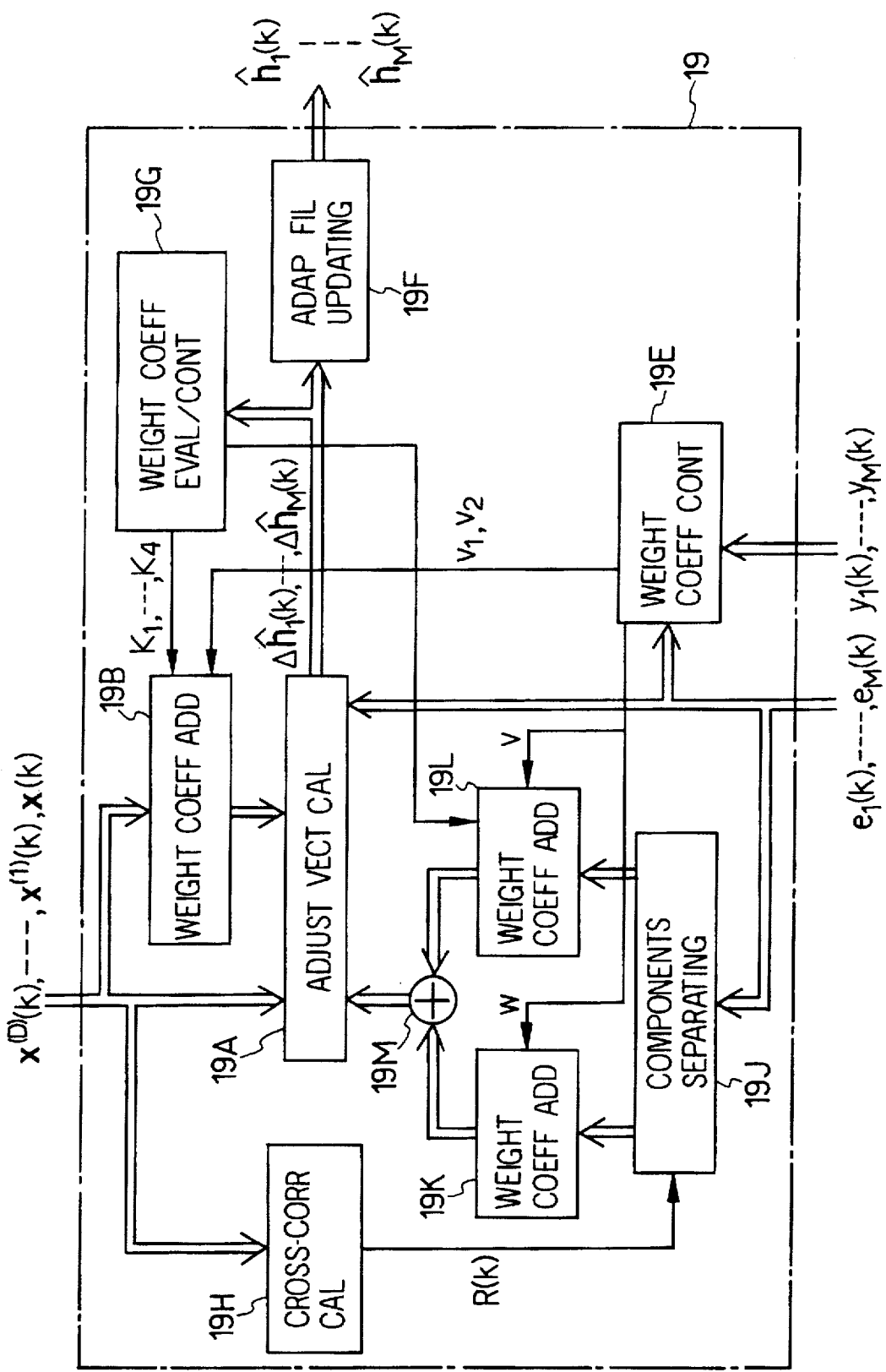
FIG. 10 is a functional block diagram illustrating another configuration of the echo path estimating part in FIG. 8.

FIG. 10 is a functional block diagram of a multi-channel acoustic echo canceller which embodies the aforementioned Methods (1-b), (2-a-3), (2-b-3), (3-b-1) and (3-b-2) which separate the error signal $e'_m(k)$ into components and weight them with the coefficients v and w. In this example, as in the FIG. 9 example, the weighting coefficient evaluation/control part 19G uses the adjustment vector $\Delta \hat{h}(k)$ to determine the weighting coefficients $k_1$ to $k_4$ which controls the influence of the echo path similarity error difference $\Delta f(k)$ and provides them to the weighting coefficient assigning part 19B. The adjustment vector calculating part 19A is supplied with the combined received signal vector $X(k)$ and channel-exchanged combined received signal vectors $X^{(10)}(k), \ldots, X^{(D)}(k)$. In this embodiment, the error signal $e'_m(k)$ is divided into a component correlated with the error signal $e_m(k)$ and the other component and they are assigned with the weighting coefficients w and v, respectively as shown in Eq. (39), (74), (84), (94), or (95). To this end, as is the case with the above, the weighting coefficient control part 19E calculates from the echoes $y_1(k)$ to $y_M(k)$ and the error signals $e_1(k)$ to $e_M(k)$ their average power ratio $$r_{pm} = \overline{|y_m(k)|^2/|e_m(k)|y^2}$$

as an index indicating the degree of convergence of the estimated echo path vector, and determines the values of the coefficients w and v accordingly. Furthermore, a cross-correlation calculating part 19H calculates the cross-correlation between the received signals by a matrix $c(k) = r'(k)r^{-1}(k)$ or $C_1(k)$ and $C_2(k)$ in Eqs. (86) to (89) and provides it to a component separating part 19J.

The component separating part 19J separates the error signal $e'_m(k)$ into the component correlated with the error signal $e_m(k)$ and the uncorrelated component, which are fed to weighting coefficient assigning parts 19K and 19L and assigned with the weighting coefficients w and v, respectively. The correlated component and the other component assigned with the weighting coefficients are added by an adder 19M and the added output is applied to the adjustment vector calculating part 19A. The adjustment vector calculating part 19A uses the signals applied thereto to solve the simultaneous equations (37), (74), (84), (94), or (95) to calculate the adjustment vector $\Delta \hat{h}(k)$, which is provided to the adaptive filter updating part 19F and the weighting coefficient evaluation/control part 19G as well. Based on the adjustment vector provided thereto, the adaptive filter updating part 19F calculates the estimated echo path vector by Eqs. (27) and (30) and outputs it.

Figure 11:
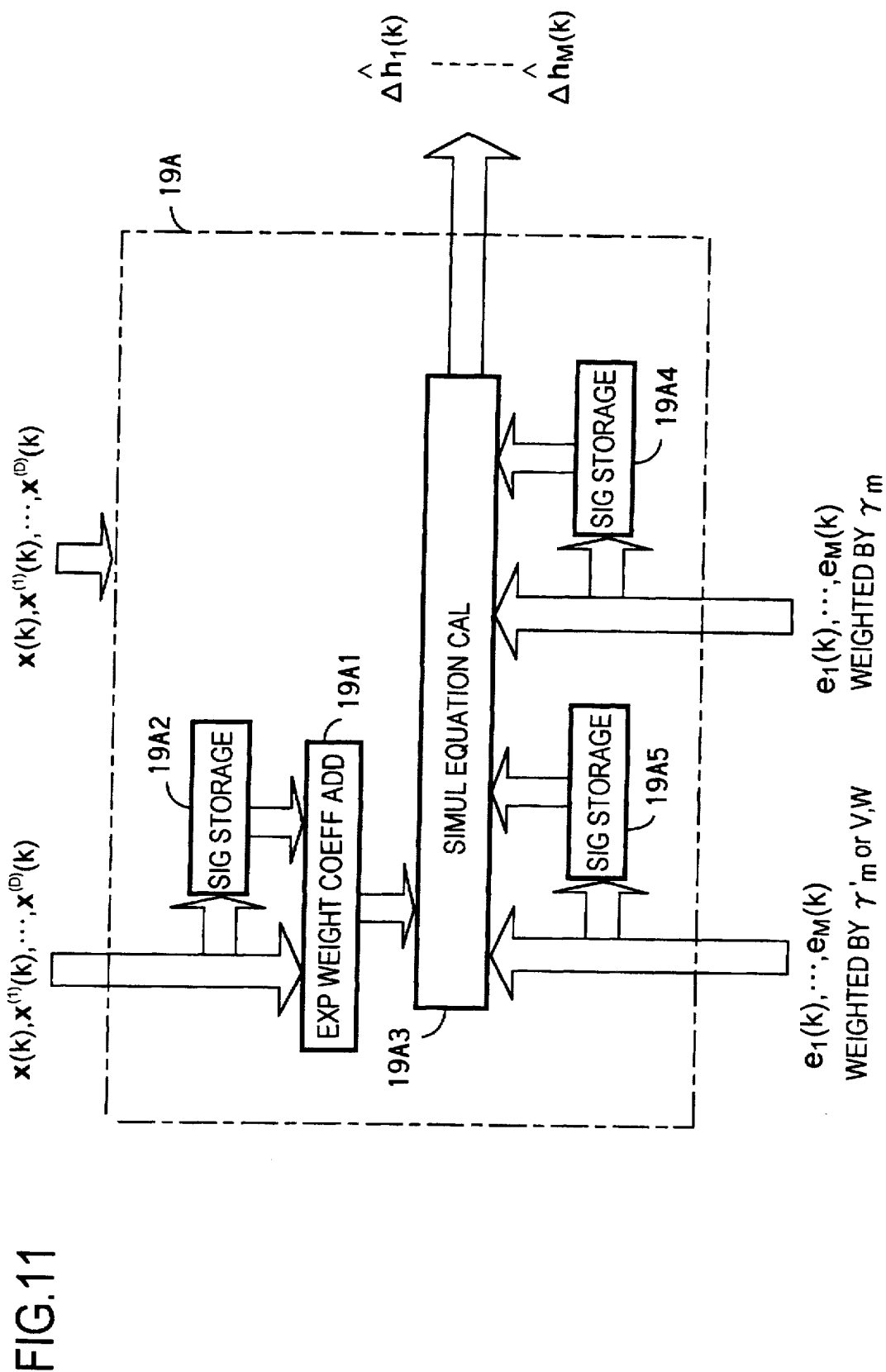
FIG. 11 is a functional block diagram illustrating the configuration of an adjustment vector calculating part in FIGS. 9 and 10.

FIG. 11 illustrates the functional block configuration of the adjustment vector calculating part 19A in the echo path estimging part 19 of FIGS. 9 and 10 which permits the application of a p-th order projection algorithm of Method 3 and the ES algorithm of Method 4 when the echo paths are highly symmetrical and hence Method (2-a) is used. To execute the p-th order projection algorithm, the received signal vectors are provided to a signal storage part 19A2, wherein (p−1) preceding received signal vectors are held, and the received signal matrix $X^{(p)}_n$ of Eq. (85), which is a set of the stored received signal vectors and the received signal vectors at the current time k, is fed to an exponential weighting coefficient assigning part 19A1, wherein the received signal matrix is assigned with a weighting coefficient by the basic exponential decay matrix $A^{(r)}$, thereafter being provided to a simultaneous equation calculating part 19A3. At the same time, the received signal vector weighted in the weighting coefficient assigning part 19B in FIGS. 9 and 10 is also provided to the simultaneous equation calculating part 19A3.

On the other hand, the weighted measured error signals $e_1(k), \ldots, e_M(k)$ and the weighted approximated error signals $e'_1(k), \ldots, e'_M(k)$ are also stored as sets of error signals at $(p_n-1)$ previous points in time and they are applied to the simultaneous equations calculating part 19A3 together with error signals at the current time. The simultaneous equations calculating part 19A3 solves the simultaneous equations (47) from the signals fed thereto to calculate the adjustment vector $\Delta \hat{h}(k)$. In the case of FIG. 10, the set of measured error signals $e_1(k), \ldots, e_M(k)$ at $(p_n-1)$ previous times are stored in the signal storage part 19A4 and are provided therefrom to the simultaneous equations calculating part 19A3 together with the set of measured error signals at the current time and the set of component-separated, weighted approximated error signals from the adder 19M is provided to the signal storage part 19A5, wherein a set of weighted approximated error signals at $(p_n-1)$ previous times is held. The $(p_n-1)$ sets of weighted approximated error signals and the set of error signals at the current time are fed to the simultaneous equations calculating part 19A3. The simultaneous equations calculating part 19A3 uses these signals to solve, for example, Eq. (74) to obtain the adjustment vector.

Figure 12:
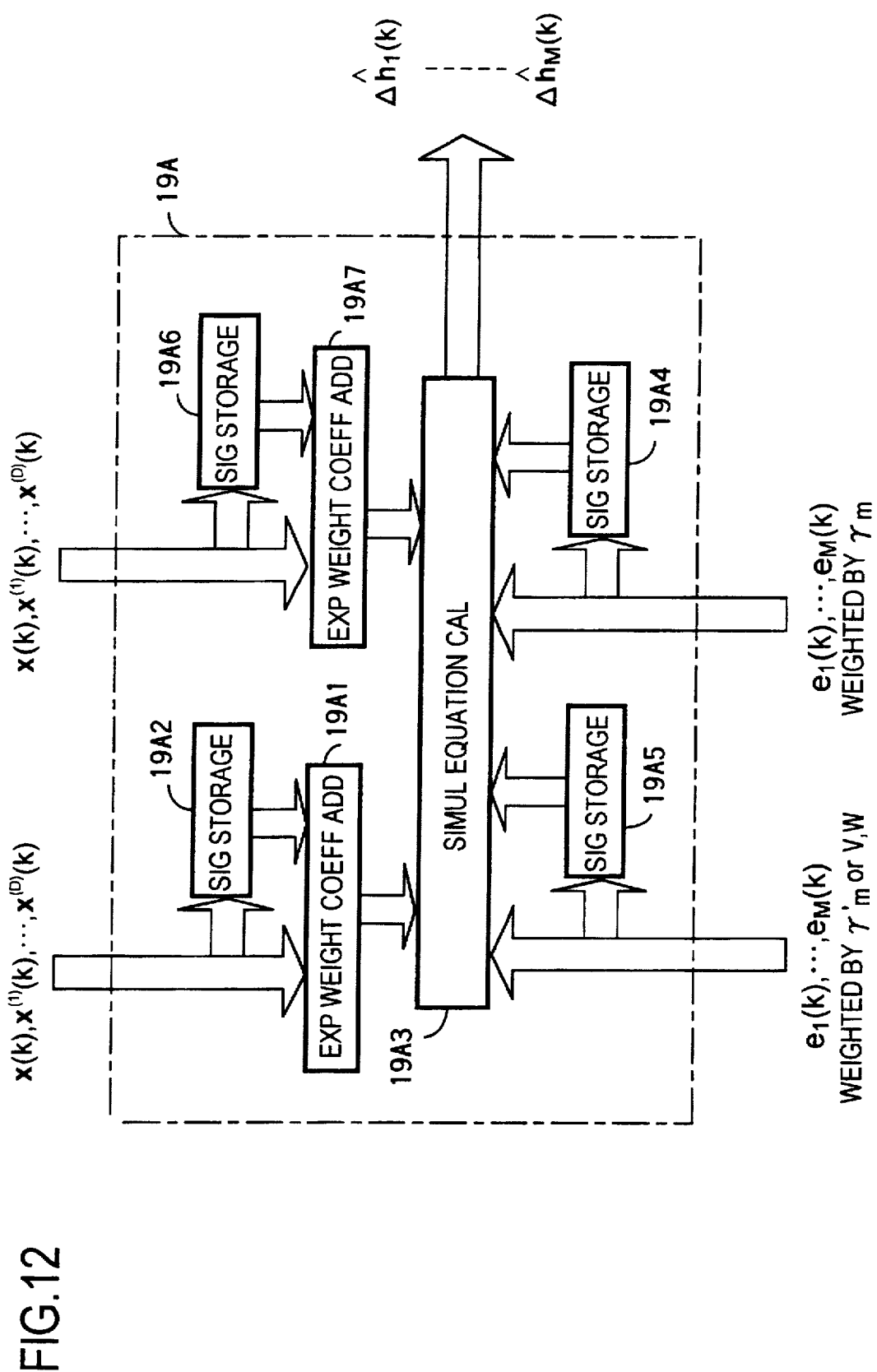
FIG. 12 is a functional block diagram illustrating another configuration of the adjustment vector calculating part in FIGS. 9 and 10.

FIG. 12 illustrates the functional block configuration of the adjustment vector calculating part 19A which is used in the echo path estimating part 19 of FIGS. 9 and 10 in the case of calculating the adjustment vector by Method (2-b), taking into account low symmetry of the echo path (i.e. The similarity error). Also in this case, the adjustment vector calculating part 19A is adapted to execute the p-th order projection algorithm of Method 3 and the ES algorithm of Method 4. This embodiment differs from the FIG. 11 embodiment in that the simultaneous equations calculating part 19A3 calculates the adjustment vector by solving any one of the simultaneous equations (69), (70), (73), (82), (84), (94) and (95) containing the similarity error difference $\Delta f$ and that a signal storage part 19A6 and an exponential weighting coefficient assigning part 19A7 are provided also for the received signal vectors assigned with the weighting coefficients by the weighting coefficient evaluation/control part 19G in FIGS. 9 and 10 for controlling the influence of the similarity error difference vector $\Delta \hat{f}(k)$. This embodiment is identical in construction with the FIG. 11 embodiment with respect to the other remaining points, of which no description will be repeated.

EFFECT OF THE INVENTION

This invention method can be used for echo cancellation in the realization of a teleconference system of highly realistic presence which permits transmission of acousto-spatial information between two points by the use of a multi-channel transmission system and terminal equipment provided with multi-channel pickup and receive systems.

Figure 4:
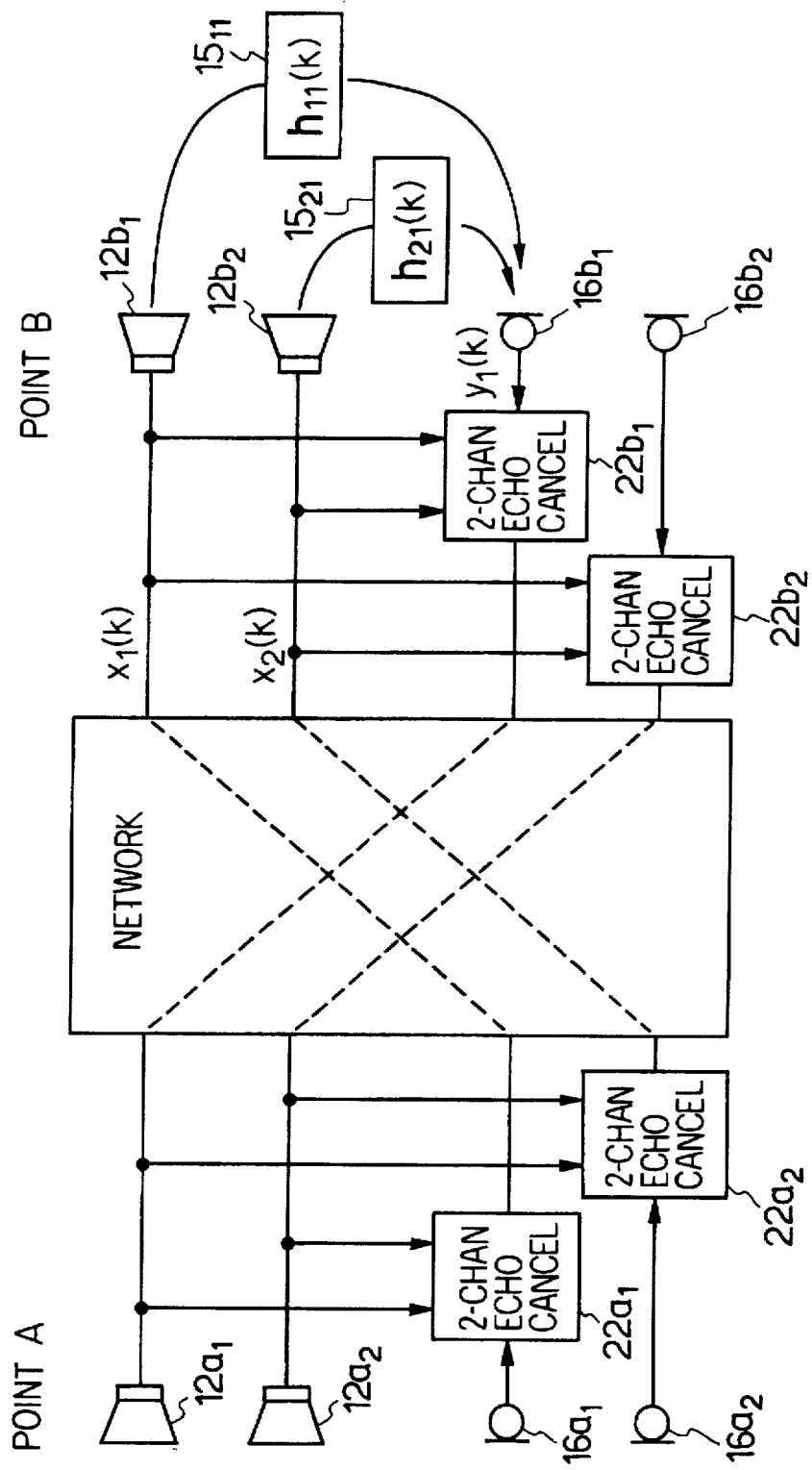
FIG. 4 is a block diagram showing a stereo telecommunication system.
Figure 5:
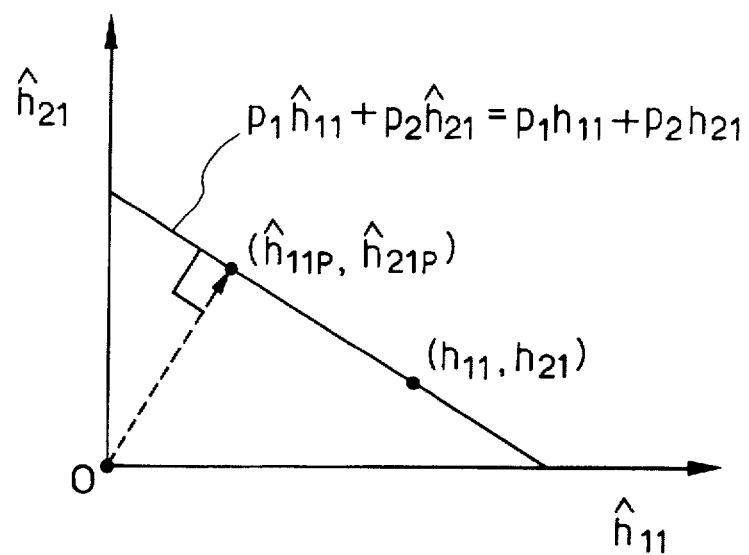
FIG. 5 is a graph showing an echo path estimating operation which is carried out when received signals have a cross-correlation.
Figure 13:
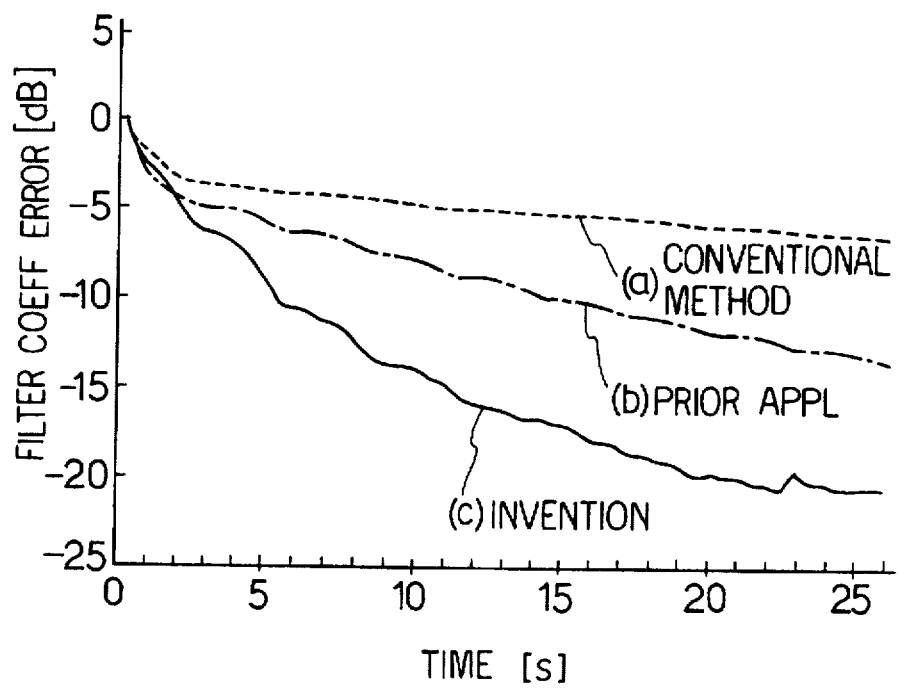
FIG. 13 is a graph showing convergence characteristics of an error between true and estimated echo path characteristics.

For the sake of brevity, consider a stereo teleconference system which connects two points via a two-channel transmission system and uses two-channel pickup and receive systems as shown in FIG. 4. For example, when a plurality of speakers speak in their seats at the point A, stereo speech signals which are picked up by two microphones bear a cross-correlation therebetween dependent on the positional relationship between the speakers and the microphones. When these speech signals are reproduced at the point B using the conventional echo canceller, the echo estimation depends on the cross-correlation between the speech signals and hence is incorrect, allowing large echoes to return to the point A each time the speaker changes. In contrast to this, the echo cancellation method of the present invention is capable of lessening the influence of the cross-correlation between the stereo signals and quickly estimating the echo path, and hence suppresses echoes from increasing whenever the speaker changes. FIG. 13 is a graph showing the results of computer simulations using, as reproduced signals, stereophonically picked up speech uttered by a speaker with his body or head fixed. The prior art method (a), a method of extracting a variation in the cross-correlation (b) proposed in the inventors' prior application (Japanese Pat. Appln. No. 50002/95), and this invention method (c) are compared in terms of the error vector between the combined estimated echo path vector generated in the echo path estimating part and the combined true echo path, with the echo path estimation starting time set at 0. An NLSM (Normalized Least Mean Squares) algorithm was used in the case of the conventional method and a second-order projection algorithm was used in the case of the method by the extraction of a variation in the cross-correlation proposed in the prior application. In the case of this invention method, the adjustment vector was calculated by Eq. (107); the weighting coefficients $\gamma_1$, $\gamma'_1$, $\gamma_2$ and $\gamma'_2$ were made time-varying in accordance with the echo return loss enhancement (ERLE), $k_1=k_2=k_3=k_4=1.0$, $p_1=p'_1=p_2=p'_2=2$, $A^{(1)}=A^{(2)}=A^{(3)}=A^{(4)}=A^{(5)}=A^{(6)}$, and they were divided into four blocks and assigned with weights 1.0, 0.5, 0.25 and 0.125. As is evident from FIG. 13, according to this invention method, the echo path error vector decreases faster than in the cases of the other methods and the vector itself is also smaller.

Figure 14:
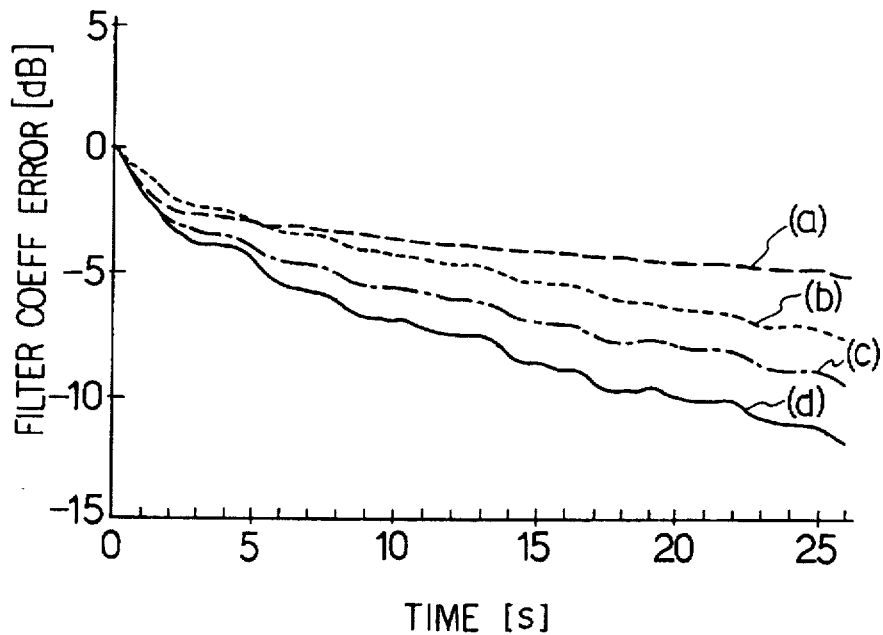
FIG. 14 is a graph showing the influence of a weighting coefficient assigned to an approximation error signal on the convergence characteristic of the error signal.

FIG. 14 is a graph showing the influences of the weighting coefficients $\gamma'_1$ and $\gamma'_2$ with the coefficients $\gamma_1$ and $\gamma_2$ set at $\gamma_1=\gamma_2=0$ in this invention method using Eq. (70). The curve (a) indicates the case where $\gamma_1=\gamma'_2=1.0$ and the curve (b) the case where $\gamma'_1=\gamma'_2=0.5$. A comparison of these curves indicates that appropriate values of the weighting coefficients $\gamma'_1$ and $\gamma'_2$ differ with the convergence of filter coefficients. Then, the values of the weighting coefficients $\gamma'_1$ and $\gamma'_2$ were changed with ERLE, that is, ERLE was large the coefficients $\gamma'_1$ and $\gamma'_2$ were set small; in this case, the characteristic was improved as indicated by the curve (c). Further, the ES algorithm based on the exponential decay characteristic of the impulse response was used, in which case the curve (d) was obtained. This is considered to be due to the fact that since this invention method approximately utilizes the unknown input-output relationships expressed by Eqs. (55) and (57), the approximation accuracy is improved by the use of the statistical property of the impulse response.

Figure 15:
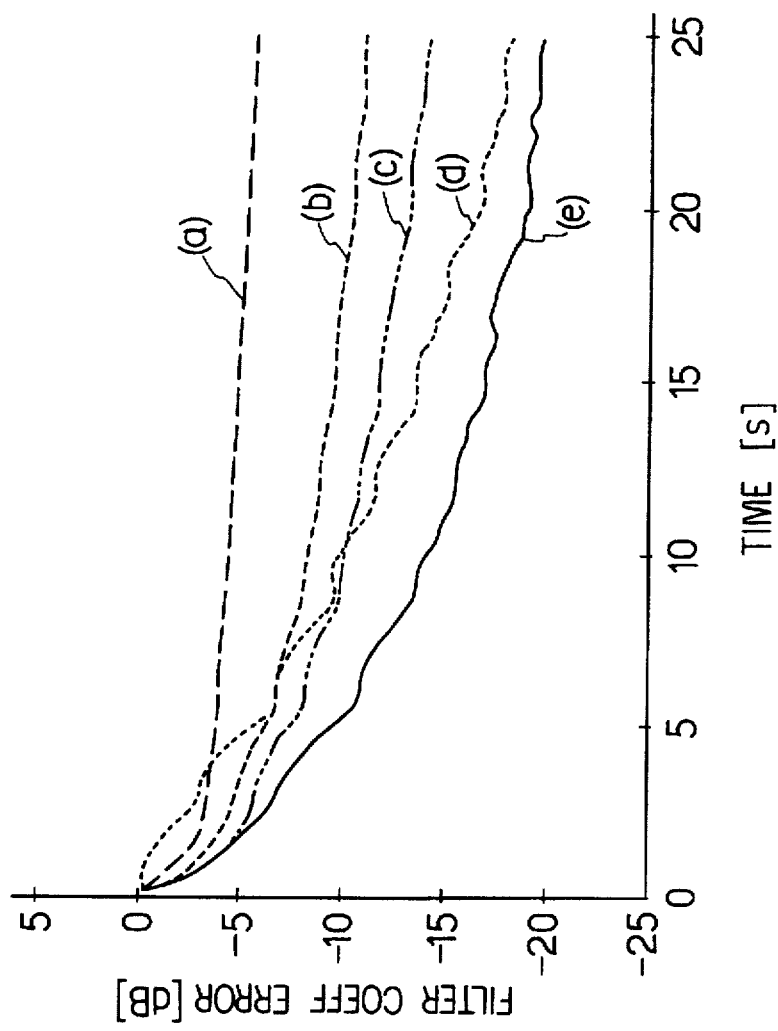
FIG. 15 is a graph showing the influence of weighting coefficients $v_1$, $v_2$, $w_1$, $w_2$, orders $p_1$, $p'_1$, $p'_2$ and step sizes $\mu_1$, $\mu_2$ on the convergence characteristic of the echo path estimation.

FIG. 15 shows the convergence characteristics of the echo path estimation which were obtained when this invention method (3-b) was used under the same conditions as in the case of FIG. 14 and the following coefficients were made time-invariant in Eq. (84).

The curve (a) indicates the case where $v_1=v_2=0$, $w_1=w_2=1$, $p_1=p'_1=p_2=p'_2=1$ and $\mu_1=\mu_2=0.5$, the curve (b) the case where $v_1=v_2=1$, $w_1=w_2=1$, $p_1=p'_1=p_2=p'_2=8$ and $\mu_1=\mu_2=0.05$, the curve (c) the case where $v_1=v_2=0$, $w_1=w_2=1$, $p_1=p'_1=p_2=p'_2=8$ and $\mu_1=\mu_2=0.05$, the curve (d) the case where $v_1=v_2=0$, $w_1=w_2=0$, $p_1=p'_1=p_2=p'_2=8$ and $\mu_1=\mu_2=0.05$, and the curve (e) the case where $v_1=v_2=1$, $w_1=w_2=0$, $p_1=p'_1=p_2=p'_2=8$ and $\mu_1=\mu_2=0.05$. As will be seen from FIG. 15, since this invention method (3-b) uses the weighting scheme of the method (1-b), the error obtained concerning the approximated input-output relationship can be evaluated excepting therefrom the error obtained concerning the observable input-output relationship or a redundant component as in the case of the curve (e) in FIG. 15; hence, good results can be obtained without varying the weighting coefficients with time as in the cases of FIGS. 13 and 14.

Example of Application

Figure 16:
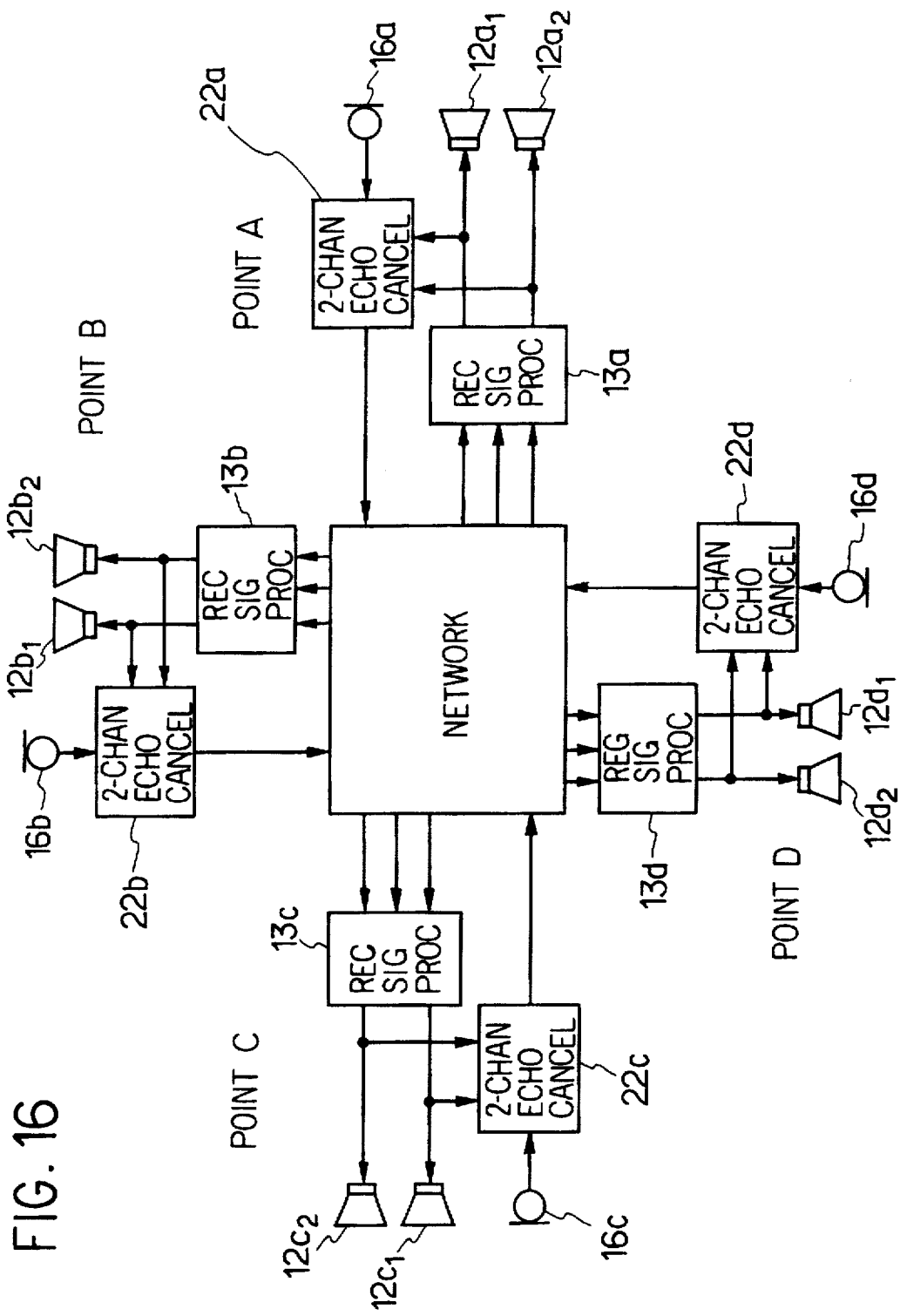
FIG. 16 is a block diagram illustrating a teleconference system which is equipped with a sound image localization function in a four-point communication.

Other than the method according to which at a terminal provided with a stereo receiving system, two-channel stereo signals picked up at the other end are received and reconstructed intact, there is proposed a method for multi-point teleconference by which the received signal for each point is freely subjected to sound image localization at the receiving side to provide a comfortable receiving environment. The method and apparatus according to the present invention are also applicable to such multi-point teleconference terminals. FIG. 16 illustrates the configuration of a four-point teleconference system. At each point the pickup system is one-channel (monaural). Now, the teleconference system will be described in connection with the point D. Let it be assumed that at the point D received signals from the points A, B and C are subjected to sound image localization so that the signals are localized at the right, center and left with respect to the point d, respectively, by which new two-channel stereo reproduced signals are generated for two-channel stereo reproduction. In this instance, a response $y_1(k)$ to the two-channel received signals $x_1(k)$ and $x_2(k)$ at some point is given as follows:

$$y_1(k) = h_{11}^T(k)x_1(k) + h_{21}^T(k)x_2(k) \quad (108)$$

By applying the echo path similarity error vector $f_1(k)$ between $h_{11}^T(k)$ and $h_{21}^T(k)$, the following equation is obtained:

$$h_{11}^T(k) - h_{21}^T(k) = f_1(k) \tag{109}$$

Then, the response $y'_1(k)$ which is obtained when the reproducing channels of the received signals $x1(k)$ and $x2(k)$ are exchanged is given as follows:

$$\begin{aligned} y'_1(k) &= h_{11}^T(k) x_2(k) + h_{21}^T(k) x_1(k) \\ &= y_1 - f_1^T(k) x_1(k) + f_1^T(k) x_2(k) \end{aligned} \tag{110}$$

By formulating simultaneous equations based on Eqs. (108) and (110), it is possible to obtain an estimated echo path vector adjustment equation according to this invention method.

Generally speaking, in the application of the conventional echo cancellation method to a teleconference system composed of a multi-receive-channel system and a pickup system of one or more channels, the echo path estimation is not correctly made when the received signals of the respective channels have a high cross-correlation; therefore, the echo increases upon each variation in the cross-correlation between the received signals. This invention method utilizes, in addition to the input-output relationships based on multi-channel received signals bearing a fixed cross-correlation, approximated input-output relationships based on multi-channel signals bearing a cross-correlation different from the above-mentioned one. That is, an unknown output is approximated which ought to be produced by each microphone that picks up acoustic signals reproduced from channels different from their originals when some or all of the multi-channel received signals are exchanged. Since the echo path estimation is made by solving simultaneous equations concerning these input-output relationships, its solution does not become indefinite, and hence such problems as described above can be reduced.

It will be apparent that many modifications and variations may be effected without departing from the scope of the novel concepts of the present invention.

What is claimed is:

1. A multi-channel acoustic echo cancellation method comprising the steps of:

(a) radiating received signals of a plurality of channels as acoustic signals by a plurality of loudspeakers respectively corresponding thereto;

(b) picking said acoustic signals from said plurality of loudspeakers up by each microphone after propagating over respective echo paths to obtain an observable echo;

(c) storing said received signals of said plurality of channels for predetermined periods of time and forming received signal vectors by said stored received signals for each channel;

(d) combining said received signal vectors in all the channels into observable combined received signal vectors;

(e) providing said combined received signal vectors to estimated echo paths having combined estimated echo path vectors which converge to combined vectors of the echo path vectors represented by impulse responses of the respective echo paths, whereby is generated an echo replica simulating said observable echo, said combined received signal vectors and said corresponding echo corresponding to said observable input-output relationships of said plurality of echo paths;

(f) subtracting said echo replica from said echo to obtain a residual echo;

(g) calculating an approximated echo replica in the case where combined exchanged received signal vectors, obtained by exchanging at least two received signals of said plurality of channels, are provided to said estimated echo paths;

(h) approximating an echo which ought to be obtained by each microphone when said received signals exchanged as in step (g) propagate thereto over said plurality of echo paths;

(i) substracting said approximated echo replica from said approximated echo to obtain an approximated residual echo;

(j) evaluating observable input-output relationships representing the relationships between said observed combined received signal vectors and said corresponding observable residual echo and approximated input-output relationships representing the relationships between said combined exchanged received signal vectors and said approximated residual echo and obtaining said adjustment vector based on the evaluation; and (k) adjusting said estimated echo path vector by said adjustment vector.

2. The method of claim 1, wherein said step (j) includes a step of weighting at least one of said approximated input-output relationships and said observable input-output relationships in their evaluation.

3. The method of claim 2, wherein said weighting step includes a step of multiplying, by time-invariant or time-varying coefficients, residual echoes which are differences between echoes corresponding to the outputs of said approximated and observable input-output relationships and echo replicas which simulate them.

4. The method of claim 2, wherein said weighting step includes a step of separating said approximated residual echo into a component correlated with said observable residual echo and other component and multiplying said components by time-invariant or time-varying coefficients independently of each other.

5. The method of claim 4, further comprising a step of calculating said approximated input-output relationships through utilization of said actually observable known input-output relationships, said observable residual echo for use in the evaluation of said known input-output relationships and the similarity between said plurality of echo paths, and on the assumption that similar echo paths are formed between loudspeakers and microphones similar in such physical positional relationships as the distances between them and their directions or orientations, introducing a difference in said similarity as an echo path similarity error vector, and calculating said estimated echo path adjustment vector by a projection algorithm through the use of said approximated input-output relationships, said observable input-output relationships and their past input-output relationships.

6. The method of claim 5, further comprising a step of introducing a weighting coefficient which makes it possible to control the influence of said echo path similarity error vector.

7. The method of claim 2, 3, or 4, further comprising a step of determining, for each operation time, the value of said weighting coefficient through utilization of at least one of the ratio between said echo and said residual echo, the average power ratio between said echo and said residual echo, the absolute value of said residual echo and the average power of said residual echo.

8. The method of claim 1, further comprising a step of calculating said approximated input-output relationships through utilization of said actually observable known input-output relations, a residual error signal for use in the evaluation of said known input-output relationships and the similarity between said echo paths.

9. The method of claim 2, further comprising a step of calculating said approximated input-output relationships through utilization of said actually observable known input-output relations, a residual error signal for use in the evaluation of said known input-output relationships and the similarity between said echo paths.

10. The method of claim 4, further comprising a step of calculating at least one of the ratio between said echo and said residual echo, the average power ratio between said echo and said residual echo, the absolute value of said residual echo and the average power of said residual echo, determining the state of convergence of said residual echo on the basis of said calculated value, and when the state of convergence of said residual echo is bad, setting the weighting coefficient for said correlated component at a predetermined value except 0 and the weighting coefficient for the other remaining component at 0, and when the state of convergence is good, setting said weighting coefficients for both of said components at predetermined values including 0.

11. The method of claim 8, further comprising a step of calculating said estimated echo path adjustment vector by using said approximated input-output relationships, said observable input-output relationships and their past input-output relationships.

12. The method of claim 11, further comprising a step of using said past input-output relationships through utilization of a projection algorithm.

13. The method of claim 8, 9, or 11, further comprising a step of utilizing said echo path similarity on the assumption that similar echo paths are formed between loudspeakers and microphones similar in such physical positional relationships as the distances between said loudspeaker and said microphones and their directions or orientations.

14. The method of claim 4, 8, 9, or 11, further comprising a step of introducing the difference in said echo path similarity as an echo path similarity error on the assumption that similar echo paths are formed between loudspeakers and microphones similar in such physical positional relationships as the distances between them and their directions or orientations.

15. The method of claim 14, further comprising a step of introducing a weighting coefficient which makes it possible to control the influence of said echo path similarity error vector.

16. The method of claim 8, 9, or 11, further comprising a step of applying an exponentially weighted step-size algorithm which provides a different adjusted weighting coefficient for each tap on the basis of the exponential decay property of impulse responses of said echo paths in the calculation of said estimated echo adjustment vector.

17. A multi-channel acoustic echo canceller comprising:
a plurality of loudspeakers for radiating received signals in a plurality of channels into acoustic signals and for outputting them;
at least one microphone connected to at least one transmission channel, acoustic paths for said acoustic signals from said plurality of loudspeakers to said microphone forming echo paths and said acoustic signals picked up by said microphone and combined into an echo for input into said transmission channel;
a received signal vector generating part for temporarily storing said received signals of said plurality of channels and for generating each received signal vector;
a vector combining part for combining said received signal vectors of said plurality of channels into combined received signal vectors;
an echo replica generating part supplied with said combined received signal vectors and combined estimated echo path vectors simulating said combined echo path vectors obtained by combining echo path vectors representing impulse responses of said echo paths from said plurality of loudspeakers to said microphone, for outputting an echo replica simulating said echo;
a subtractor for subtracting said echo replica vector from said echo output from the microphone and for outputting the difference as an observable residual echo;
a vector permuting/combining part for generating combined rearranged received signal vectors obtained by combining said received signals of said plurality of channels after rearranging at least two received signals of said plurality of channels; and
an echo path estimating part supplied with at least said combined received signal vectors and said observable residual echoes corresponding thereto, for obtaining approximated echo replica in the case of applying each of said combined received signal vectors to one of said estimated echo paths, for obtaining, as an approximated echo by approximating the inputs into said plurality of echo paths, an unknown echo to be obtained from said microphone in the case of said received signals being exchanged, for subtracting said approximated echo replica from said approximated echo to obtain an approximated residual echo, for evaluating an observable input-output relationship representing the relation between said combined received signal vector and said observable residual echo corresponding thereto and an approximated input-output relationship representing said rearranged combined received signal vector and said approximated residual echo corresponding thereto, for obtaining said adjustment vector on the basis of the evaluation, for generating an estimated echo vector obtained by adjusting said estimated each path vector with said adjustment vector, for providing it to said echo replica generating part.

18. The echo canceller of claim 17, wherein said echo path estimating part comprises:
residual echo weighting means for weighting said observable residual echo and said approximated residual echo relative to each other;
an adjustment vector calculating part for calculating said adjustment vector on the basis of the relationships between said combined received signal vector and said rearranged received signal vector and between said observable residual echo and said approximated residual echo; and
an adaptive filter updating part for adjusting said estimated echo path vector by said adjustment vector and for providing said adjusted estimated echo path vector to said echo replica generating part.

19. The echo canceller of claim 17, wherein said echo path estimating part further comprises:
component separating part for separating said approximated residual echo into a component correlated with said observable residual echo and other non-correlated component; and
weighting means for weighting said correlated component and said non-correlated component relative to each other.

20. The echo canceller of claim 19, wherein said echo path estimating means further comprises cross-correlation calculating part for calculating the cross-correlation of said rearranged received signal vector with said received signal vector and said component separating part comprises means for calculating the product of said cross-correlation calculated by said cross-correlation calculating part and said observable residual echo as said component of said approximated residual echo which is correlated with said observable residual echo.

21. The echo canceller of claim 18 or 19, wherein said echo path estimating part further comprises a weighting coefficient control part for calculating, at each operation time, at least one of the ratio between said echo and said residual echo, the average power ratio between said echo and said residual echo, the absolute value of said residual echo and the average power of said residual echo as an index representing the state of convergence of said observable residual echo and for controlling said weighting coefficients on the basis of said calculated value.

22. The echo canceller of claim 18 or 19, wherein said echo path estimating part further comprises a similarity error weighting part for assigning said received signal vector with a weighting coefficient for controlling the influence on said residual echo by a similarity error difference vector which is a difference between a similarity error vector between similar echo paths and a similarity error vector between said estimated echo paths corresponding to said similar echo paths.

23. The echo canceller of claim 18 or 19, wherein said adjustment vector calculating part comprises a signal storage part for storing said received signal vectors, said rearranged received signal vectors and said residual echoes at a predetermined number of previous points in time going back from the current time, and a simultaneous equations calculating part for obtaining said adjustment vector by solving simultaneous equations through utilization of the relationships among said received signal vectors, said rearranged received signal vectors and said residual echoes at said previous points in time from the current time and said adjustment vector.

24. The echo canceller of claim 22, wherein said adjustment vector calculating part comprises a signal storage part for storing said received signal vectors, said rearranged received signal vectors and said residual echoes at a predetermined number of previous points in time going back from the current time, and a simultaneous equations calculating part for obtaining said adjustment vector by solving simultaneous equations through utilization of the relationships among said received signal vectors, said rearranged received signal vectors and said residual echoes at said predetermined number of previous points going back from said current time, said adjustment vector and said similarity error difference vector.

25. The echo canceller of claim 23 or 24, wherein said adjustment vector calculating part further comprises an exponentially weighting means for weighting said received signal vectors and said rearranged received signal vectors at said predetermined number of previous points going back from said current time by exponential decay coefficient vectors of the same numbers of elements as those of said received signal vectors and said rearranged received signal vectors, and said simultaneous equations calculating part uses an exponentially weighted step-size algorithm to calculate said adjustment vector.

* * * * *